July 18, 1950
N. B. COLEY
2,515,633
AIR TRAFFIC CONTROL SYSTEM
Filed May 18, 1949
11 Sheets-Sheet 1
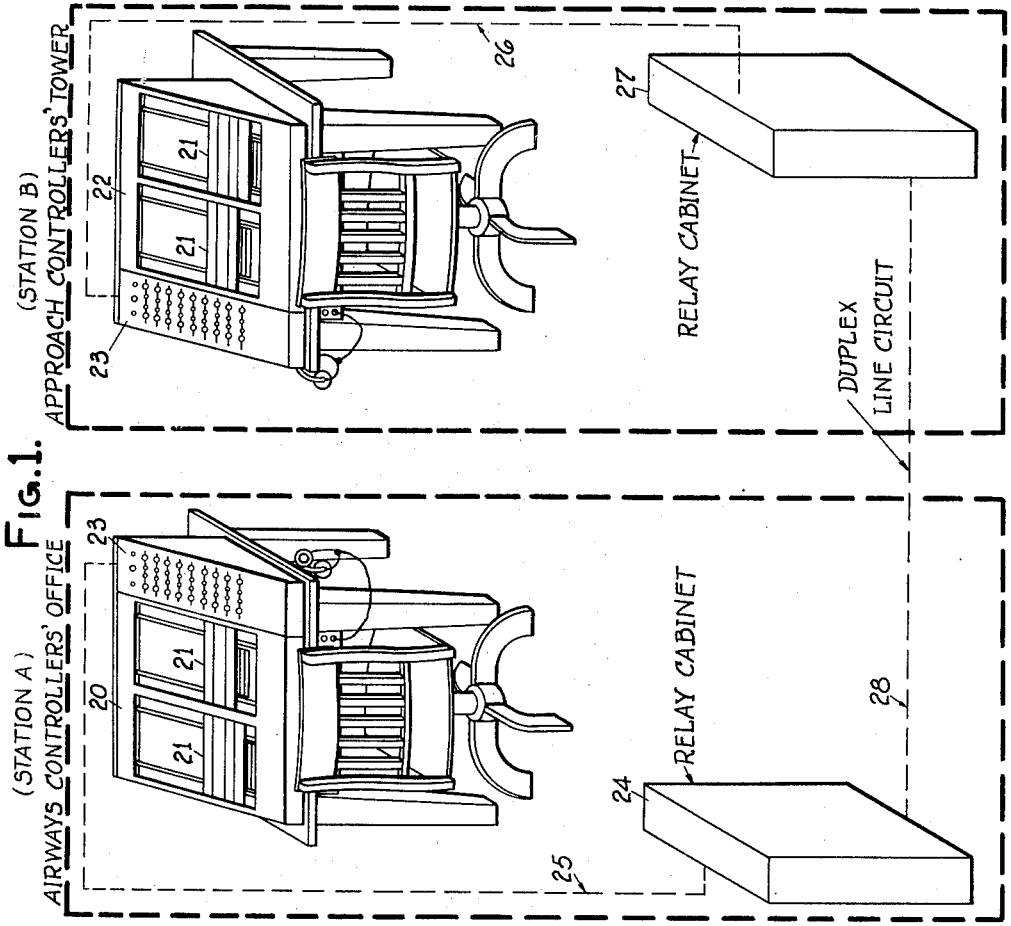
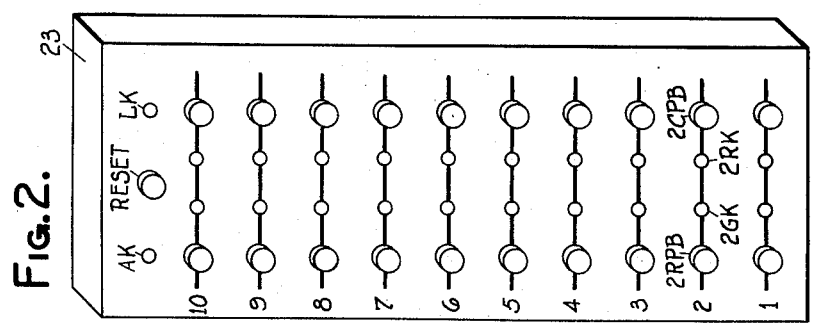
INVENTOR.
BY N. B. Coley,
Neil H. Preston,
his ATTORNEY July 18, 1950     N. B. COLEY     2,515,633
AIR TRAFFIC CONTROL SYSTEM
Filed May 18, 1949     11 Sheets—Sheet 2
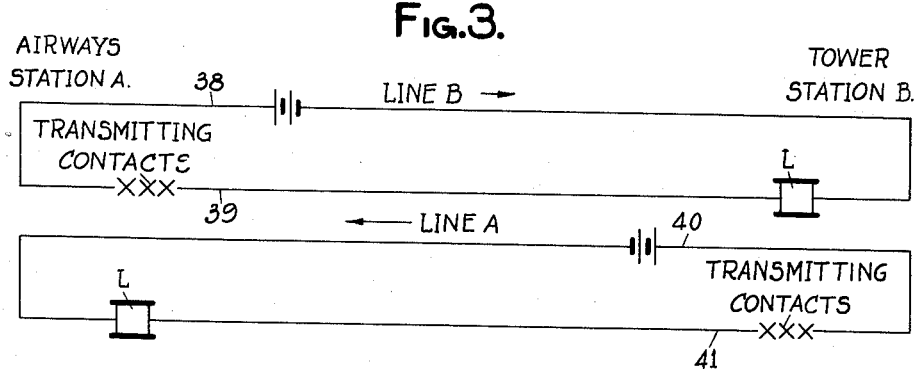
FIG. 3.
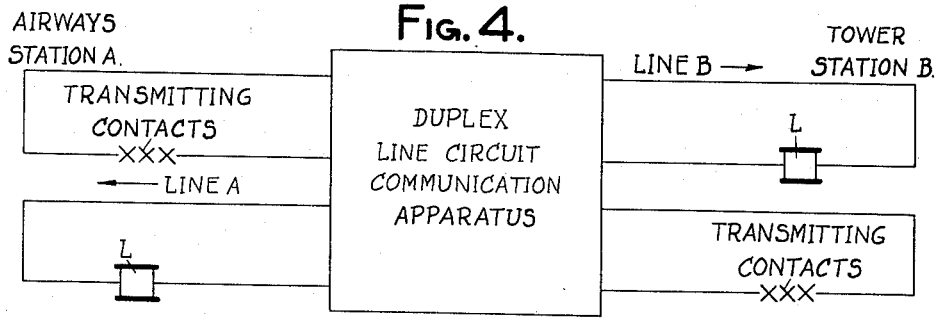
FIG. 4.
FIG. 11.
CODE CHART
| STA. A. RESERVATION STA. B. CANCELLATION | | | | | | STA. B. RESERVATION STA. A. CANCELLATION | | | | | |
|---|---|---|---|---|---|---|---|---|---|---|---|
| ALTITUDE | DIGIT | | | | | ALTITUDE | DIGIT | | | | |
|  | 1 | 2 | 3 | 4 | 5 |  | 1 | 2 | 3 | 4 | 5 |
| 10 | M | M | M | M | M | 10 |  | M | M | M | M |
| 9 | M | M | M | M |  | 9 |  |  | M | M | M |
| 8 | M | M | M |  | M | 8 |  | M |  | M | M |
| 7 | M | M | M |  |  | 7 |  |  |  | M | M |
| 6 | M | M |  | M | M | 6 |  | M | M |  | M |
| 5 | M | M |  | M |  | 5 |  |  | M |  | M |
| 4 | M | M |  |  | M | 4 |  | M |  |  | M |
| 3 | M | M |  |  |  | 3 |  |  |  |  | M |
| 2 | M |  | M | M | M | 2 |  | M | M | M |  |
| 1 | M |  | M | M |  | 1 |  |  | M | M |  |
M = MARK CODE CHARACTER
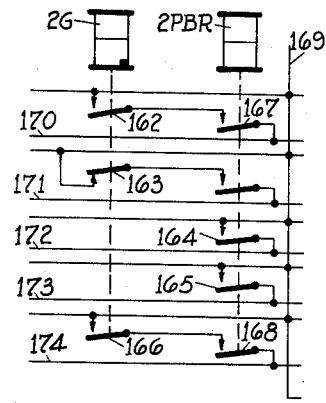
FIG. 8.
INVENTOR.
N. B. Coley,
BY Neil W. Preston,
his ATTORNEY

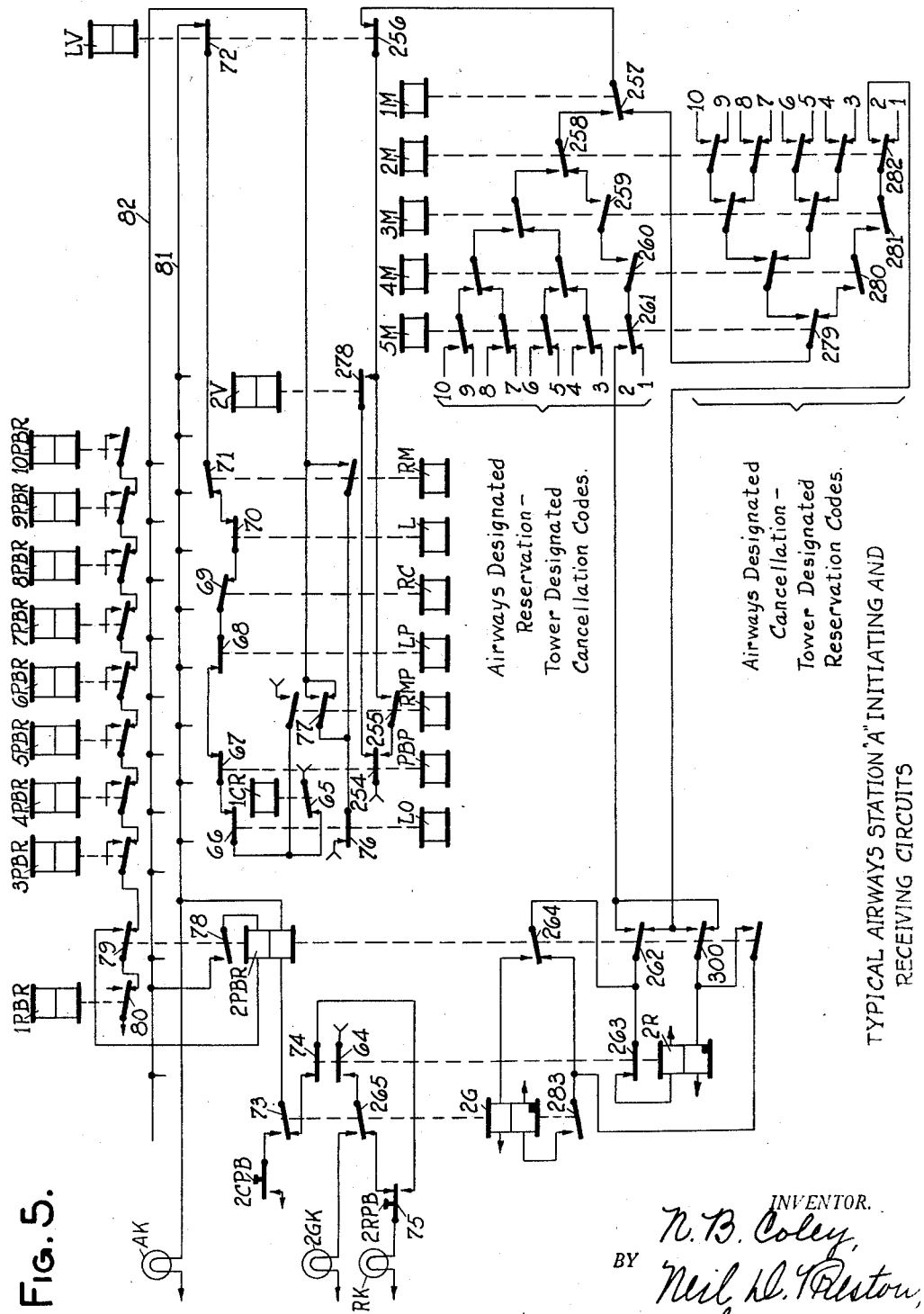

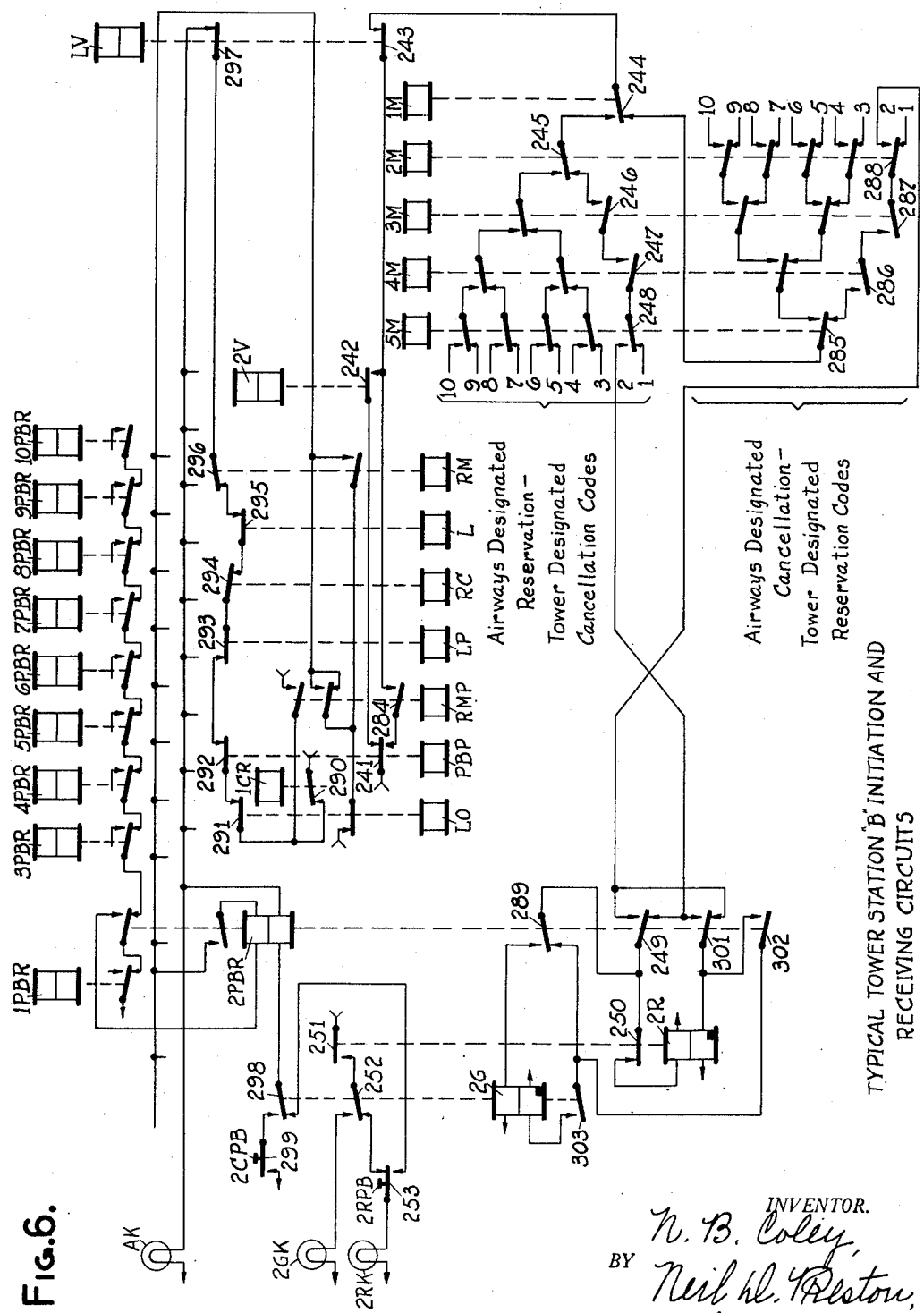

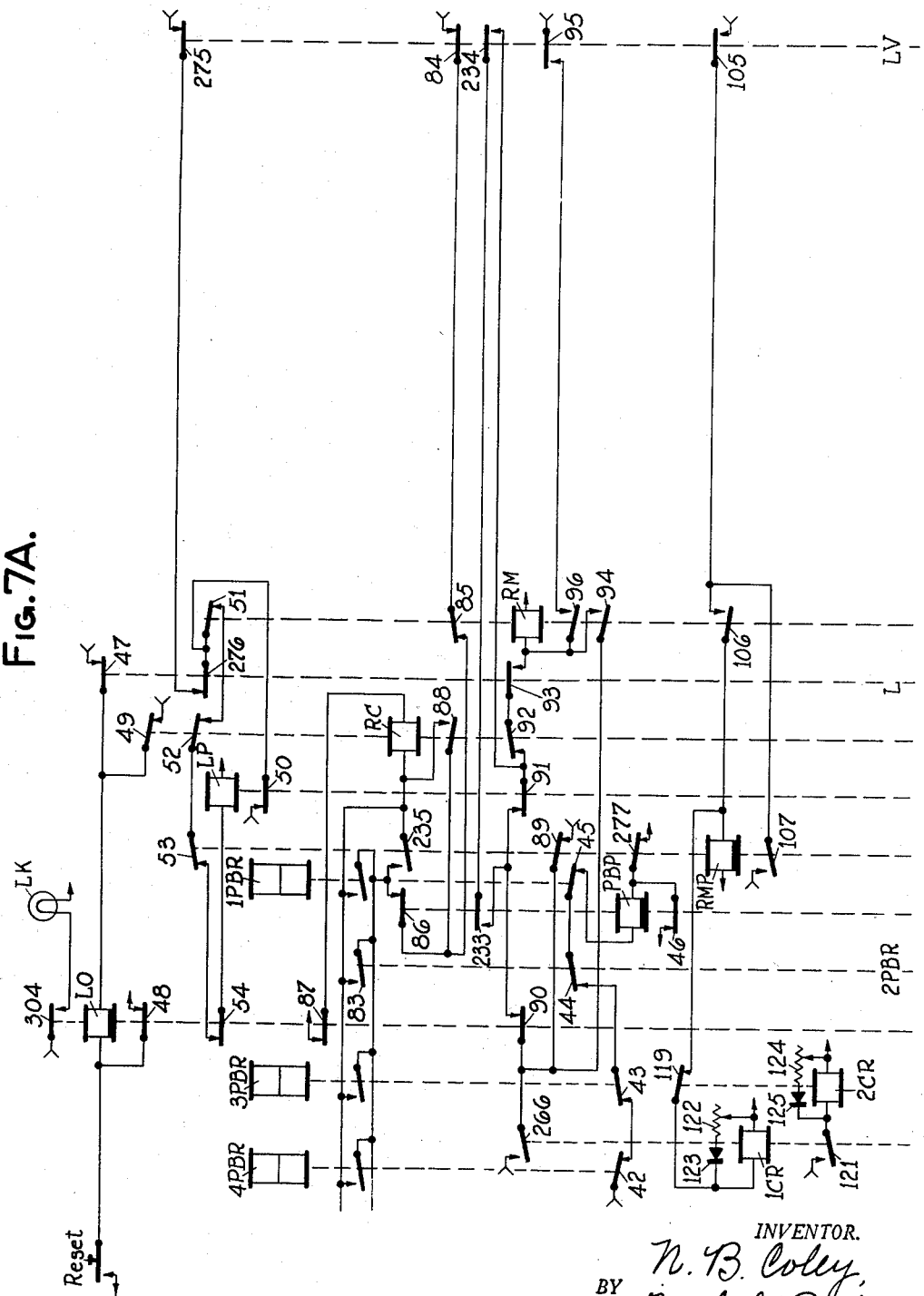

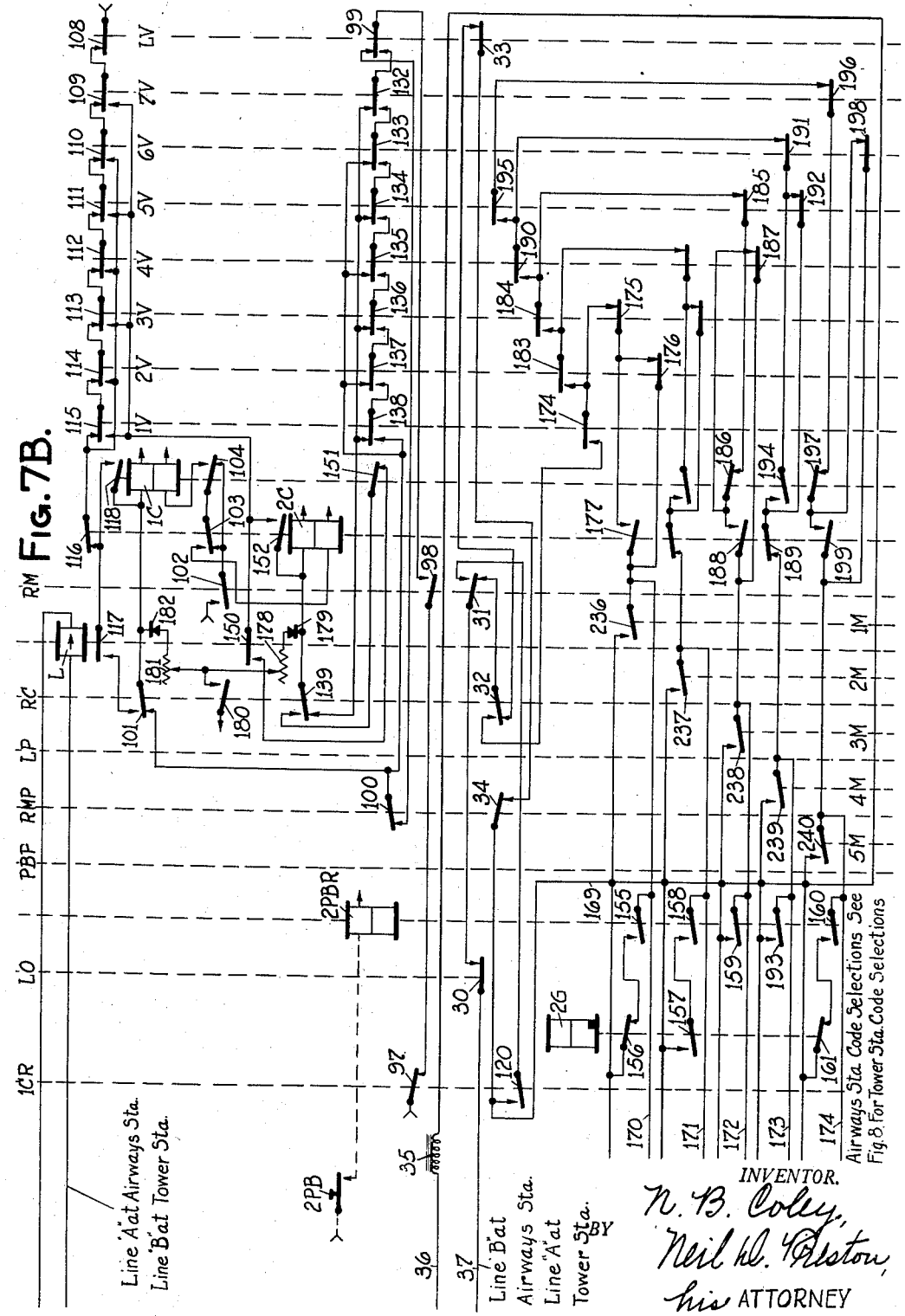

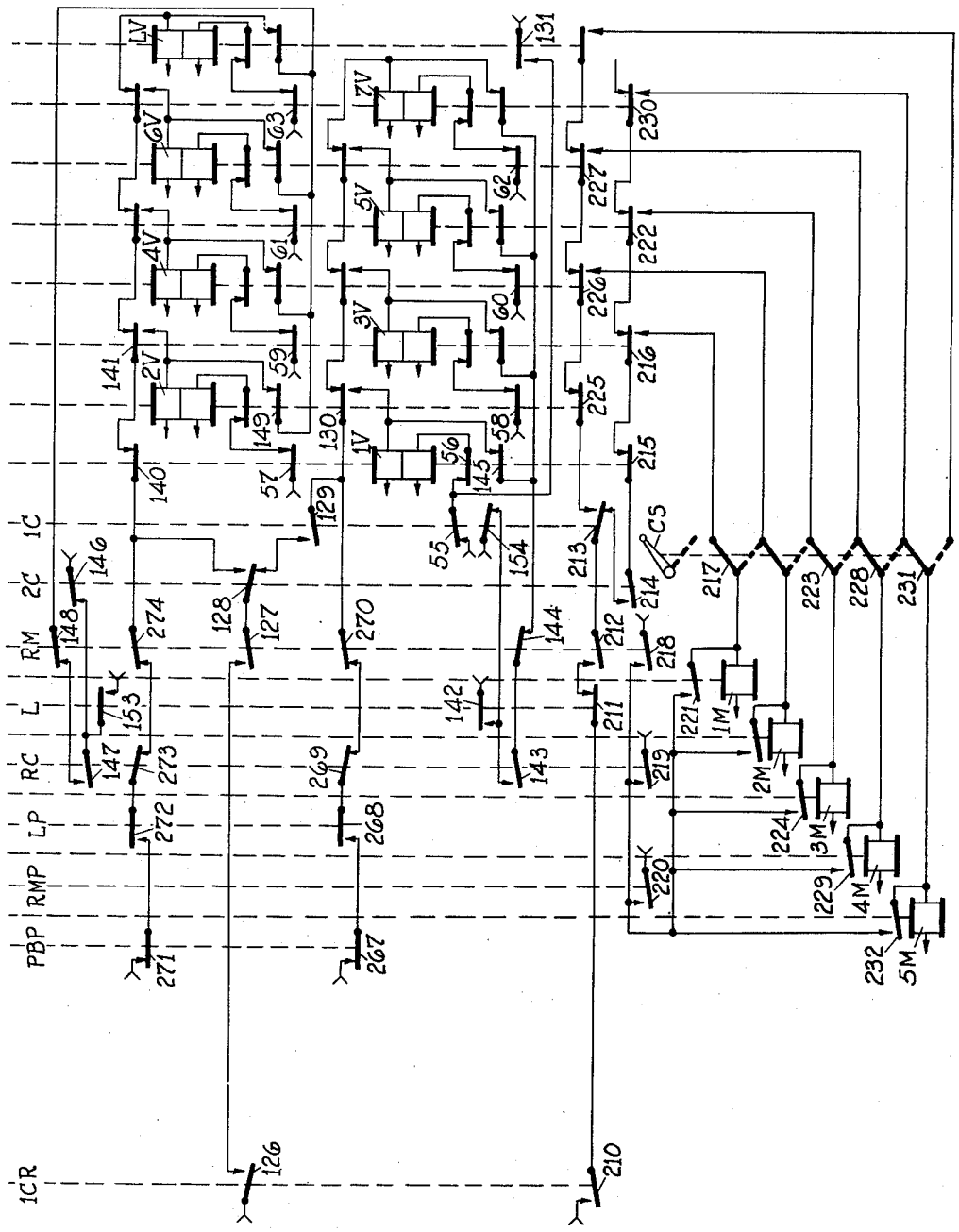

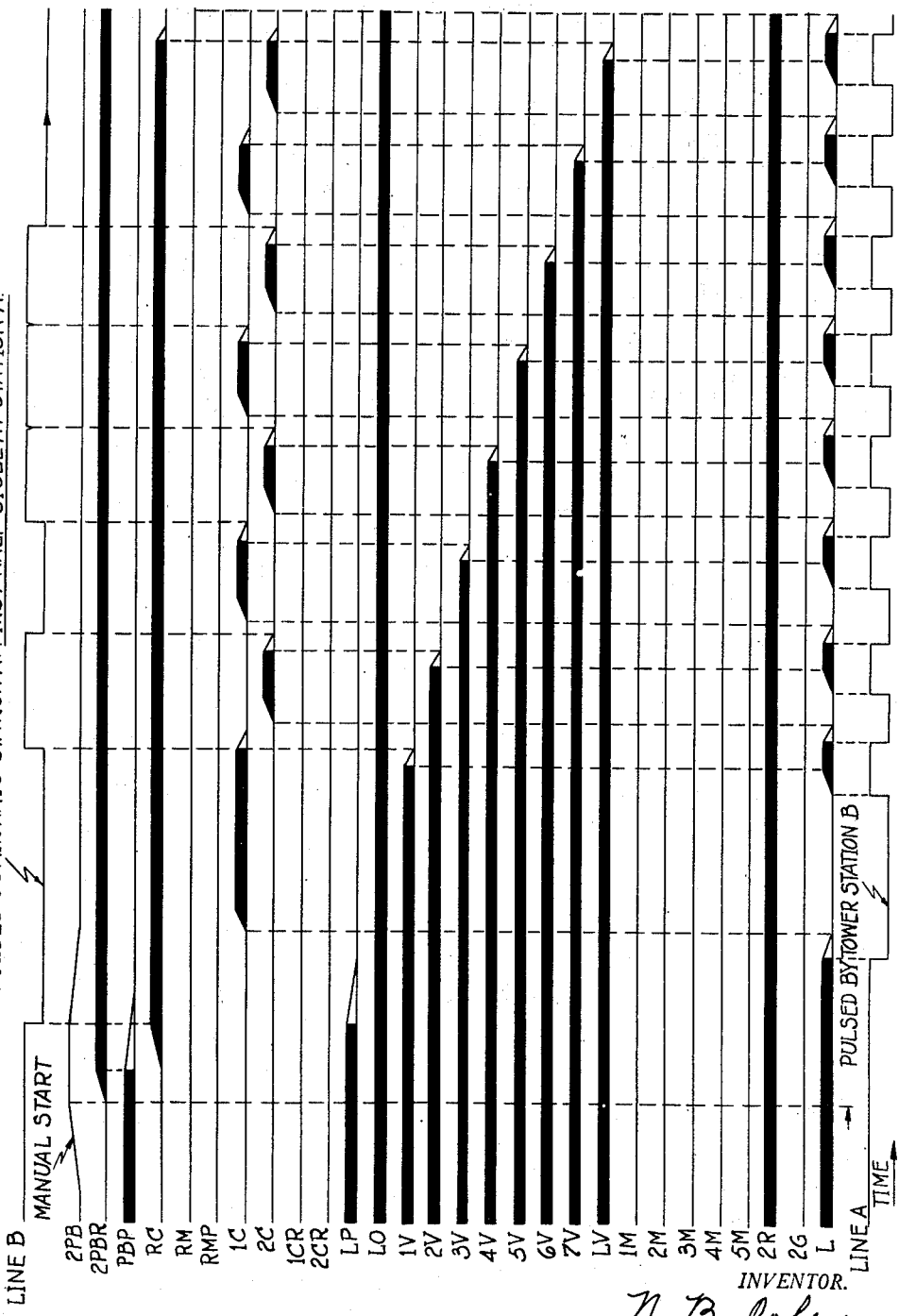

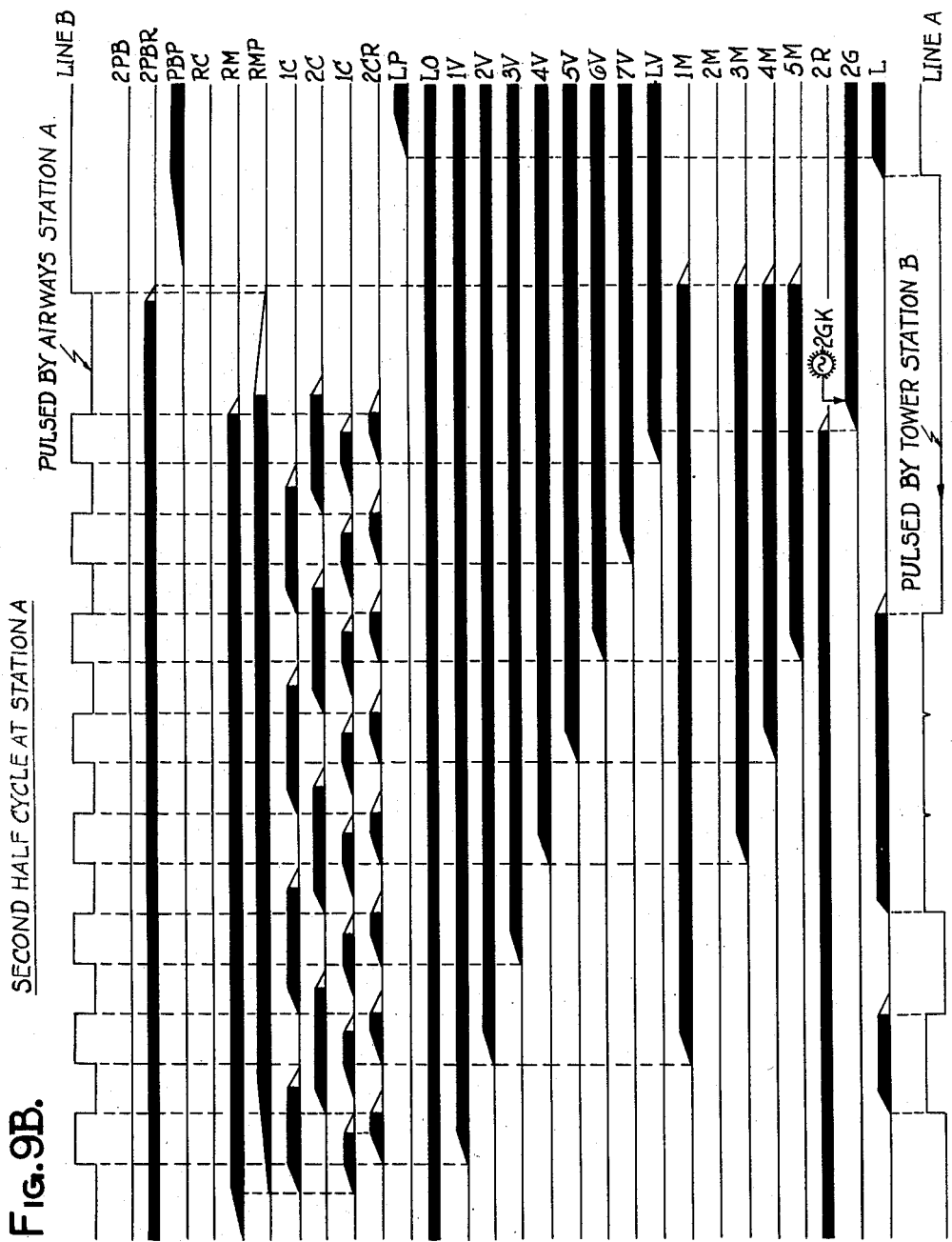

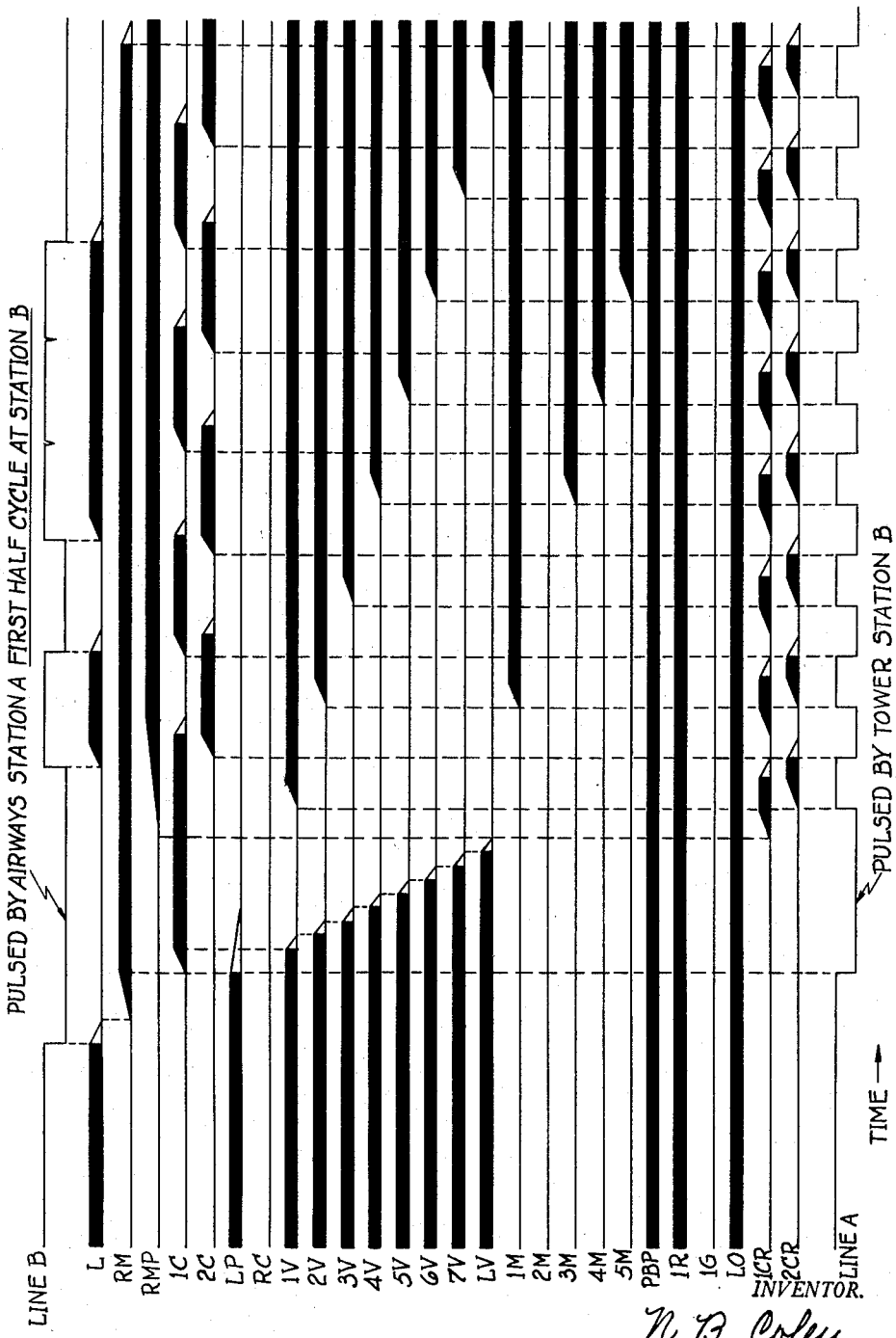

Patented July 18, 1950

2,515,633

UNITED STATES PATENT OFFICE 2,515,633

AIR TRAFFIC CONTROL SYSTEM

Nelson B. Coley, Rochester, N. Y., assignor to General Railway Signal Company, Rochester, N. Y.

Application May 18, 1949, Serial No. 93,900

19 Claims. (Cl. 177—353)

This invention relates to air traffic control systems and it more particularly pertains to such systems employing code communication apparatus that is normally at rest from which the system can be initiated into respective cycles of operation for the communication of controls and/or indications between two remotely spaced stations.

One condition under which such a code communication system is applicable is in the coordination of the supervising or controlling of airplane flights at respective assigned altitudes from two remotely spaced offices or stations, one office which can be termed an airways office having facilities for controlling the flights of airplanes along respective airways, and the other office which can be termed an approach controller's tower having facilities for controlling the approach of airplanes to a landing runway at an airport. Thus by the use of code communication apparatus an interfacility air traffic control system is provided which, by the use of circuit interlocks greatly facilitates the transfer of the supervision of airplane flights from the authority of the controller in one office to the authority of a controller at the other office. This system is adaptable for use particularly during the landing of airplanes at an airport. A system of this general character is disclosed in my prior application Ser. No. 34,961, filed June 24, 1948, wherein direct wire circuit connections are provided for the interlocking and coordination control of indicator lamps for respective flight altitudes on control boards in the two offices. Because of the large number of line wires required in the organization according to this prior application, it is not economical to apply the system according to this prior application where the two offices are located an appreciable distance apart.

An object of the present invention is to provide an interfacility air traffic control system wherein the designation on a control board by a controller of respective altitude clearance requests and cancellations at one office for any particular flight altitude is effective to set up indications in response thereto for the corresponding flight altitude in the other office by code communication over a duplex line circuit connecting the two offices. Distinctive indication aspects are provided for each flight altitude to indicate whether or not that flight altitude has been reserved and also as to the particular office at which a reservation is made. Thus one aspect of the indication means is provided as a clearance indication at the office where the reservation is designated and the other aspect is provided at the other office to indicate that the associated altitude is reserved by a controller at the other office.

Another object of the present invention is to provide means by which a tower controller can designate that he is taking over a flight from the supervision of an airways controller, such designation being effective to cancel clearance indication for the associated flight altitude at the airways office and set up a clearance indication for that flight altitude on the control board at the tower.

Another object of the present invention is to provide a normally at rest code communication system wherein a designated control is transmitted by code from a first station to a second station during the first half of an operating cycle and wherein each pulse of the code is checked by retransmission back to the first station from the second station during the second half of the cycle.

Another object of the present invention is to communicate controls and/or indications by code in a time sharing system wherein two line circuits are simultaneously employed, one line circuit being used for transmission of message pulses from a given end of the circuit during the first half of the cycle and the transmission of stepping pulses during the last half of the cycle, and the other line circuit being used simultaneously for transmitting stepping pulses during the first half of the cycle and message check pulses during the last half of the cycle.

Another object of the present invention is to check back to the transmitting station during the last half of each cycle each code pulse that has been received at the other station during the first half of that cycle and to distinctively indicate at the transmitting station when there is an out-of-correspondence condition of the check back code received at that station with the code message that has been selected for transmission during the first portion of the cycle.

Another object of the present invention is to provide interlocking means for interlocking two remotely spaced transmitting stations in an inter-facility system permitting only one station to transmit at one time, and permitting neither station to transmit until after a reset button is actuated in case both stations initiate transmission simultaneously.

Another object of the present invention is to provide means for selectively governing the time separation between respective stepping pulses and subsequent message pulses so as to permit an increase in this time under conditions where such increase is required because of increased propagation time of the code pulses through the line circuits.

Other objects, purposes, and characteristic features of the present invention will be in part obvious from the accompanying drawings, and in part pointed out as the description progresses.

In describing the invention in detail reference is made to the accompanying drawings in which similar and correspondng parts are designated by like reference characters, and in which—

Fig. 1 is a perspective view illustrating somewhat diagrammatically the system organization provided by the present invention for coordination of controlling operations at remotely spaced airways and approach controllers' offices;

Fig. 2 is an elevational view in perspective of a control panel shown in Fig. 1 at each of the offices;

Fig. 3 illustrates diagrammatically a suitable line circuit organization for the communication system connecting the airways and tower stations A and B respectively;

Fig. 4 illustrates another system of line circuits which may be employed for connecting the remotely located stations A and B;

Fig. 5 illustrates initiating and decoding circuits that are provided at the airways controllers' station A;

Fig. 6 illustrates initiating and decoding circuits that are provided at the airport approach controllers' station B;

Figure 10B:
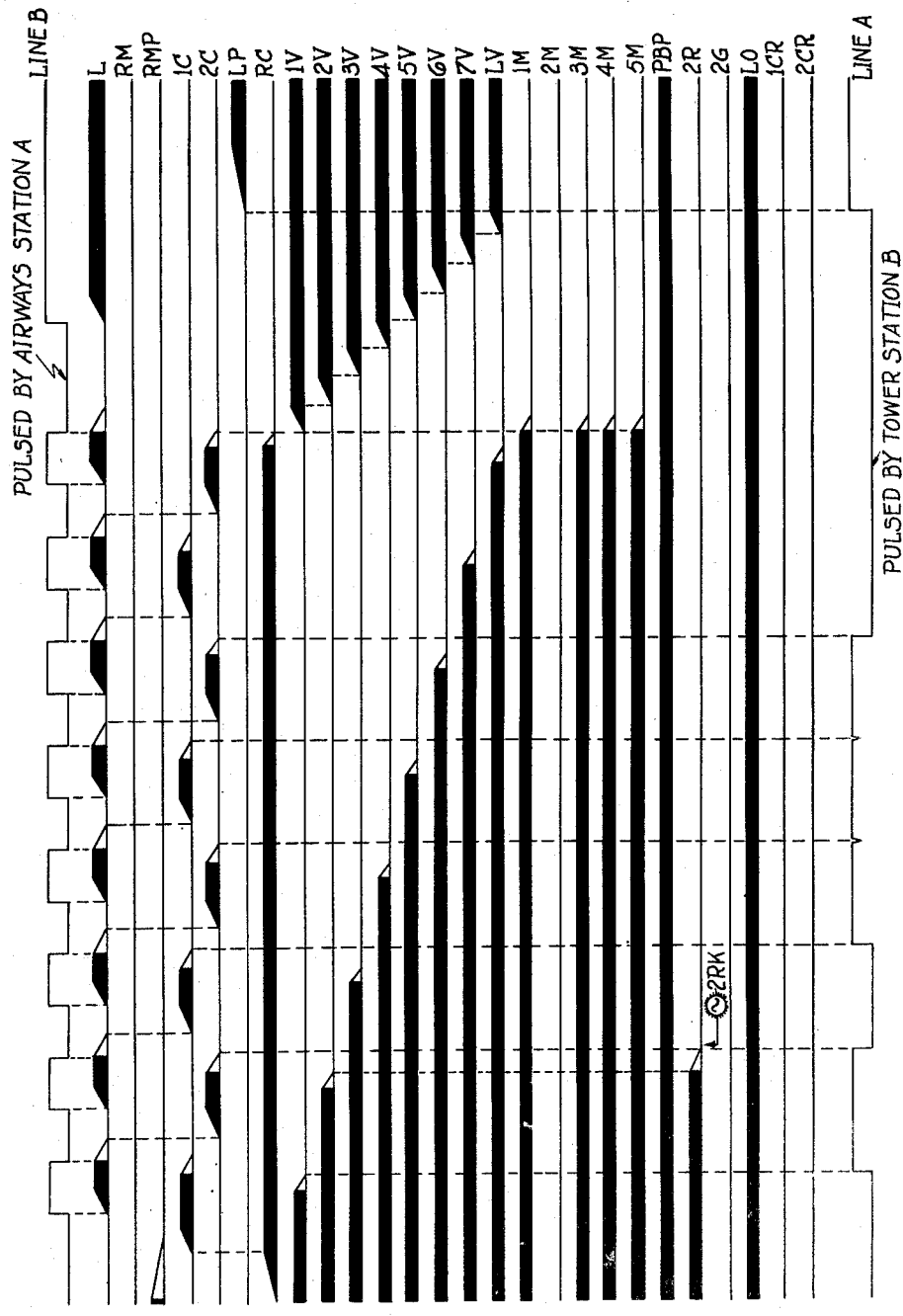

Figs. 7A, 7B and 7C when placed in vertical alignment illustrate typical code communication apparatus such as is provided at each of the stations;

Fig. 8 illustrates a code determining circuit organization for a particular flight altitude at the tower station B;

Figs. 9A and 9B when placed side by side constitute a sequence chart illustrating the timing and sequence of operation of respective relays at the airways station A during a typical cycle of operation;

Figs. 10A and 10B when placed side by side constitute a sequence chart illustrating the sequence of operation and timing of relays at the tower station B during a typical cycle of operation; and, Fig. 11 is a code chart showing the manner in which codes are assigned for the respective flight altitudes and functions associated therewith for this embodiment of the present invention.

The various circuit organizations are illustrated by schematic wiring diagrams so as to more particularly facilitate an understanding of the mode of operation of the system rather than to attempt to point out the details of the construction and arrangement of parts that can be provided by those skilled in the art in accordance with the requirements of practice. The symbols (+) and (—) have been used to indicate connections to the respective positive and negative terminals of suitable batteries or other sources of direct current as a means of simplifying the disclosure of the circuit organization.

System apparatus

The general organization of the system for directing air traffic is such that the control of airplane flights along a plurality of different airways is provided at an airways control center which is identified for purpose of description of the present invention as "station A." It is the duty of the controllers at the center to direct the flight of airplanes over the airways in such a manner as to prevent confliction and unnecessary congestion of traffic. For the purpose of facilitating the keeping track of the flight altitudes that are assigned to respective airplanes along various portions of the airways, suitable means is generally provided at the center as illustrated in Fig. 1, commonly known as flight progress boards. These boards such as the board 20 have vertical banks of horizontal slots for the insertion of flight progress strips 21 that are used in identifying the respective airplane flights, one strip 21 being provided for each distinctive flight altitude, and each vertical bank of strips 21 being provided for a particular point along the airways commonly known as a "fix." In this way the respective airways controllers keep track of airplane flights and instruct the airplane pilots by suitable radio communication apparatus as to the flight altitudes at which they are to fly, and the manner in which they are to approach airports where landings are to be made. It is not possible for the airways controllers at the center to adequately govern the actual landing of the airplanes at the respective airports, however, so the normal procedure is that the authority for governing the respective airplane flights be transferred from the center to the respective airport towers when airplanes approach such towers for landings.

A typical airport approach control tower is illustrated in Fig. 1, and for the purpose of description of this embodiment of the present invention, it will be considered as "station B." The apparatus at the tower is illustrated in Fig. 1 as including a flight progress board 22 as a means for keeping track of the airplane flights as they approach a landing strip at the airport, such flight progress board 22 being comparable to the flight progress board 20 that has been described as being employed at the airways control center. It is to be understood, however, that the flight progress board at the tower can be replaced by a control board of the general character that is disclosed, for example, in my prior application Ser. No. 34,962, filed June 24, 1948, now Patent No. 2,475,221, under conditions where there is sufficient traffic at the airport to warrant such an installation as a means for evenly spacing airplanes as they approach a runway.

The particular flight progress board 20 at the airways center that is concerned with controlling the flights of airplanes approaching the tower at station B is provided with a control and indication panel 23 having push buttons and indicator lamps for each of the respective flight altitudes whereby reservation and clearance indications are provided for respective airplane flights that are identified by flight progress strips 21 of the adjoining section of the associated flight progress board 20. Thus a flight progress board 20 at the center (station A) comprises the panel 23 and a vertical bank of flight progress strips 21 which are both provided for a particular portion of the airway or fix immediately in approach of the airport tower (station B).

At the tower (station B), a similar organization is provided in that the vertical bank of flight progress strips 21 and the adjoining panel 23 of the flight progress board 22 are provided for indicating requests and clearances for flight altitudes over the same portion of the airway, or fix, in approach to the airport as is accomplished by the similar apparatus at the center.

It is therefore provided at the tower that the panel 23 and the adjoining vertical bank of flight progress strips 21 are provided for airplane flights in approach of the tower, and the approach controller at the tower, by using information from such panel, is able by radio telephone communication with the respective pilots to permit the airplanes to move in closer in approach of the runway for landings in a systematic manner. The right-hand bank of flight progress strips 21 at the tower is assumed to be provided as a means for keeping track of airplane flights that may be in a central holding stack, for example, to which they are transferred from an outer holding stack or fix as they are permitted to approach more directly a landing strip at the airport.

The panels 23 on the flight progress boards 20 and 22 at the respective stations A and B, in addition to providing clearance indications at both stations as to which flight altitudes have been assigned, provide means for greatly facilitating the transfer of authorization for controlling airplane flights from an airways controller to an approach controller at the airport in a manner that will be more readily apparent when consideration is given more specifically to the mode of operation of the system.

An enlarged view of a panel 23 corresponding to the panels 23 illustrated on the boards 20 and 22 at the respective airways and approach controllers' offices is shown in Fig. 2. This panel 23 according to Fig. 2, has disposed thereon in horizontal alignment respective requests and clearance push buttons RPB and CPB and respective clearance and reservation indicator lamps GK and RK. These respective buttons and indicator lamps are disposed in vertical alignment, each horizontal row being identified as associated with its particular flight altitude by the particular numerals appearing on the panel at the left-hand end thereof. The buttons RPB and CPB constitute respective reservation and cancellation manually operable designating means, and although such designating means is provided by two separate push buttons according to this embodiment of the present invention, it is to be understood that such designation could be incorporated into a single multiple position switch or button, such as a push-pull button, wherein reservation and cancellation designations can be respectively made. A suitable button of this character is disclosed in the patent to J. F. Merkel No. 2,305,185, dated December 15, 1942.

The indicator lamps GK and RK in addition to being distinctive because of their respective locations on the board, are preferably provided with distinctive aspects as to color, the lamp GK for each altitude being provided as a green lamp, and the lamp RK for each altitude being provided as a red lamp. It is to be understood that the indications of these lamps may be provided in combination with the associated buttons in any suitable manner in accordance with the requirements of practice. For example, a button of the nature of that disclosed in the above mentioned patent to J. F. Merkel, may be employed if desired, having a central light indicator unit including a lamp receptacle for both a red and green lamp so that the indications for the respective flight altitudes can be provided by inclusion within the button.

System indicator lamps AK and LK are provided at the top of each panel for indicating respective availability of the code communication system for use and a lock-up condition that may become effective as initiation of the system is designated exactly simultaneously at both stations. Between the availability and indicator lamps AK and LK is disposed a reset button which is a conventional push button that is employed in resetting the system where there has been simultaneous initiation at both stations as indicated by the energization of the lamp LK.

With reference to Fig. 1, the panel 23 of the flight progress board 20 is illustrated as having wiring connections to a suitable relay cabinet 24 at station A by the dotted line 25, and similarly the dotted line 26 is indicative of wiring connections from the panel 23 of the flight progress board 22 at station B to the relay cabinet 27 at that station. Connection between stations is illustrated by the dotted line 28 which represents any suitable duplex circuit connection between the relay cabinets 24 and 27 of the two remotely located stations.

With reference to Fig. 3 a simple embodiment of line circuit organization that is suitable for the communication system according to the present invention is illustrated wherein two independent line circuits are provided connecting the respective stations A and B. One of the circuits which will be hereinafter considered as "line A" has a line battery that can be located at either station, a line relay L at station A, and transmitting contacts at station B for pulsing the line circuit. "Line B" is a similar circuit organization except that it includes a line relay L at station B and transmitting contacts at station A. It will be readily recognized from this organization that transmission from station A to station B is effected by the pulsing of line B, while transmission from station B to station A is accomplished by pulsing line A.

With reference to Fig. 4 a similar line circuit organization is illustrated except that the circuits at the respective terminals of stations A and B are illustrated as being connected to duplex communication apparatus which is to be considered as any suitable line circuit communication expedient which may be desirable to employ in practice in accordance with the distance between stations and in accordance with the line communication facilities available. This duplex communication apparatus can be considered to include independent line circuits as in Fig. 3 with suitable repeater stations added, can be considered to include two line wires and a common wire, or can be considered to include any suitable means for obtaining two distinctive channels in a communication system such as is commonly employed for telephone, telegraph, or teletype circuits. In any case, both lines A and B are assumed to be normally energized so that their respective line relays L are normally energized relays and are pulsed in accordance with the opening and closing of the associated line circuits at the other stations.

With reference to Fig. 5, in addition to the push buttons and indicator lamps that are provided for each of the flight altitudes at the airways station A, a push button repeater relay PBR is provided for each flight altitude to be picked up in response to the actuation of a reservation or cancellation button for that altitude, such relay PBR having stick circuit means for maintaining it picked up throughout the cycle, thus requiring that the actuation of the push buttons be only momentary. A magnetic-stick relay R and a magnetic-stick relay G is also provided for each flight altitude, the relay R being more particularly for governing the energization of the indicator lamps associated with that flight altitude, and the relay G being effective to select as to whether a green or a red lamp is to be energized. A similar organization of relays PBR, R and G, are provided at the tower station B for similar purposes as is illustrated in Fig. 6. It will be more readily apparent as the description progresses that these three relays per flight altitude at both stations are all of the relays that are required as being provided for each flight altitude in that all of the other relays are part of a system communication organization that has the same mode of operation irrespective of for which altitude manual designation has been made.

Inasmuch as the circuits for this system organization of the communication apparatus are similar for both field stations, the apparatus shown in Figs. 7A, 7B and 7C is to be understood as being provided at each of the stations except for slight differences in code selection and line circuit connections as noted on the drawing in Fig. 7B.

This system of communication apparatus comprises a push button repeater relay PBP (see Fig. 7A) which has slow drop away characteristics. Such relay is dropped away in response to actuation of a push button PB at a station which is transmitting, and remains dropped away at that station throughout the entire cycle as a means for preventing interruption of the cycle by another start from that station, and for other circuit selection purposes to be readily apparent when considering the specific circuit organization along with the mode of operation of the system.

A line relay L is provided at each station as has been heretofore pointed out when considering the line circuit organization, and lock relays LP and LO are provided as a means for preventing station interference, the relay LP being effective to prevent interference from one station with a cycle that has been initiated at the other station, and the relay LO being normally inactive, but being responsive to a condition of simultaneous initiation at both stations.

Relays RC, RM and RMP are provided as control relays that are more particularly concerned with the conditioning of the system to receive respectively stepping pulses or message pulses. Thus the relay RC is picked up at each station when that station is receiving stepping pulses from the other station, and similarly the relays RM and RMP are picked up at each station during the portion of a cycle when that station is receiving message pulses that are transmitted from the other station.

Stepping pulse transmitter relays ICR and 2CR are provided at each station for pulsing the line circuit that is used in controlling the line relay at the other station at times when stepping pulses are to be transmitted. These are relatively quick acting relays which have associated therewith a shunting resistor and rectifier combination for governing the drop away time and thus governing the length of the stepping pulses that are transmitted, and the length of the time spaces between pulses.

Relays IC and 2C are provided for use in the transmission of message pulses, and these relays also serve as half-step relays in the stepping relay circuits. Stepping relays V and the last step relay LV are provided at each station for marking the respective steps of each cycle. These stepping relays are dropped away successively to form respective steps during the first half of a cycle at the station where the control has been designated, and they are successively picked up during the corresponding half-cycle at the other station. During the last half of the cycle, the stepping relays V and the last step relay LV are successively dropped away at the station that is retransmitting the message, while the corresponding stepper relays at the other station are successively picked up during that half-cycle.

Message relays M are provided at each station for use in decoding the message received at that station, these relays being normally deenergized, and one relay M being provided for each character of the communication code which is employed. Each relay M is picked up in response to the reception of a mark for the particular one of the five character code elements with which that relay M is associated. The relays M are provided with stick circuits to maintain them picked up until the scanning of the complete complement of the code has been completed so that execution can be rendered effective at the completion of the code as a means for decoding the respective controls that are transmitted.

OPERATION

General

To consider the general mode of operation of the system first before considering the specific circuit organizations that provides for this mode of operation, reference can be made to Figs. 9A and 9B which illustrate diagrammatically the conditions of energization of the respective lines A and B throughout a complete cycle of operation. The top line is illustrative of the condition of energization of line B during a cycle of operation when a reservation control has been designated at the airways station A for transmission to the tower station B. Thus with reference to Figs. 3 and 4, it will be noted that line B is pulsed by the transmitting station A and therefore is pulsed during the first half of the cycle in accordance with the message to be transmitted from station A to station B.

The other line circuit is pulsed by station B under the assumed conditions, and thus the line A is selectively opened as indicated diagrammatically by the lower line of Figs. 9A and 9B to transmit stepping pulses to effect substantial synchronization between the steppers at both stations A and B. It will thus be seen that the designation of a control for transmission from station A to station B initiates the transmission of stepping pulses over one line circuit from station B for stepping synchronization purposes, and at the same time a message code is transmitted over the other line circuit from station A to station B.

When the first half of the cycle is completed, the general conditions of communication as described above are reversed in that station A then becomes effective to transmit stepping pulses over line B during the last half of the cycle and station B becomes effective to transmit the identical message pulses back to station A over line A that were received from station A during the first part of the cycle.

Upon receiving the last half of the cycle at the station A where the control was assumed to have been designated, the energization of a red or a green lamp for the corresponding designated flight altitude is rendered effective, only provided that the message received from station B is identical with the message that was transmitted from station A during the first half of the cycle. In this way, any failure of a designated control to be received at the other station is immediately brought to the attention of the controller who has designated that control for transmission so that he can immediately take whatever steps may be necessary to correct the error.

*Normal conditions*

Normally the system is at rest and the conditions that prevail when it is at rest can be considered as the normal conditions of the system.

With reference to Figs. 3 and 4, irrespective of the particular type of line circuit that is employed, lines A and B are both normally closed and energized, and thus the line relay L at each station is normally energized when the system is at rest. The transmitting contacts in each of the line circuits that are indicated in Figs. 3 and 4 by the letters XXX have a plurality of different combinations wherein they may close the line circuits under different conditions so as to close a connection between the line wires (see Fig. 7B) at the transmitting end of the circuit. The closing of the line circuit at the transmitting end between these two wires is accomplished at each station under normal conditions through front contact 30 of relay LO, back contact 31 of relay RM, back contact 32 of relay RC, front contact 33 of relay LV, back contact 34 of relay RMP, and the adjustable inductance 35. The wires 36 and 37 of Fig. 7B across which the transmitting contacts are connected are to be considered for station A as being connected to the wires 38 and 39 (see Fig. 3) respectively of line B; and similarly these wires 36 and 37 as shown in Fig. 7B are to be considered when associated with apparatus at station B to be connected across the line wires 40 and 41 of line A at that station.

The push button repeater relay PBP at each station is energized under normal conditions in accordance with there having been no controls designated for transmission from one station to the other. Thus with reference to Fig. 7A, the relay PBP is maintained picked up by its stick circuit which extends from (+), including back contact 42 of relay 4PBR, back contact 43 of relay 3PBR, back contact 44 of relay 2PBR, back contact 45 of relay IPBR, winding of relay PBP, and front contact 46 of relay PBP, to (—). Although this circuit is shown to include only contacts of the relays PBR for the flight altitudes from 1-4 inclusive, it is to be understood that similar contacts of relays PBR for each of the other flight altitudes that may be in use in the system would necessarily be included in this circuit. This relay PBP must be picked up before the initiation of the system for the transmission of a control can be rendered effective, as the dropping away of such relay is rendered effective upon initiation of a cycle to prevent the designation of other starts from interfering with the transmission of a first control that has been designated in a manner to be more readily apparent as the description progresses.

The relays LO and LP which have to do with lock-out conditions between the two stations are both normally energized. The relay LO is normally energized by a circuit extending from (+), including front contact 47 of relay L, winding of relay LO and front contact 48 of relay LO, to (—). The inclusion of back contact 49 of relay RC in multiple with front contact 47 of relay L in the circuit for relay LO provides that this relay is maintained picked up at all times except when controls are simultaneously designated at the two stations. This relay has sufficiently slow drop away characteristics to be maintained picked up throughout each control cycle due to intermittent energization by the pulsing of contact 47 of the line relay L at that station. The circuit by which the relay LP is normally energized extends from (+), including front contact 50 of relay LP, back contact 51 of relay RM, back contact 52 of relay RC, back contact 53 of relay RMP, front contact 54 of relay LO, and winding of relay LP, to (—).

The stepper relays V are also normally energized because of their stick circuits being closed. Thus the relay IV (see Fig. 7C) is maintained picked up by its stick circuit which includes back contact 55 of relay IC, front contact 56 of relay IV, and lower winding of relay IV. The other stepper relays are provided with similar stick circuits except that these circuits are dependent for energization upon the stepper relay for the preceding step being picked up. Thus the closure of front contacts 57, 58, 59, 60, 61, 62 and 63 of relays IV, 2V, 3V, 4V, 5V, 6V, and 7V respectively governs the energization of the stick circuits of relays 2V, 3V, 4V, 5V, 6V, 7V and LV respectively.

The indication control relay R that is provided for each flight altitude at each of the stations can be assumed to be normally in its picked up position if it is considered that there are no reservation indications set up on the boards under the conditions that are assumed to be normal. These relays R are not energized, however, under these conditions as they are maintained picked up by reason of their magnetic-stick characteristics. Each of these relays when picked up maintains the indicator lamps on the control panel for the associated flight altitude deenergized as is shown in Fig. 5, for example, wherein the relay 2R when normally picked up opens the circuits for the indicator lamps 2GK and 2RK at back contact 64. An indication that the system is at rest is provided by the illumination of the availability lamp AK at each of the stations. The circuit by which the lamp AK at station A, for example, is energized when the system is at rest extends from (+), including back contact 65 of relay ICR, front contact 66 of relay LO, front contact 67 of relay PBP, front contact 68 of relay LP, back contact 69 of relay RC, front contact 70 of relay L, back contact 71 of relay RM, front contact 72 of relay LV, and lamp AK, to (—).

*Initiation of a cycle*

Initiation of a cycle can be rendered effective by the manual designation of either a reservation or a cancellation control upon actuation of the particular respective reservation button RPB or cancellation button CPB on the control panel for the particular flight altitude for which the control is desired. A typical circuit organization responsive to such designation is shown in Fig. 5 for the No. 2 flight altitude, and this circuit organization is to be understood as typical of the circuit organizations provided for designation of reservations and cancellations for other flight altitudes.

To consider the mode of operation of the system upon designation of controls for transmission, it will be assumed that a controller at the airways station A, after observing the illumination of the availability lamp AK, actuates the button 2RPB for the transmission of a reservation control for the altitude No. 2. The depression of the self-restoring push button 2RPB on the control panel at station A at a time when the system is at rest and the normal conditions of the system prevail causes the picking up of the push button repeater relay 2PBR, which in picking up establishes a stick circuit to maintain relay 2PBR picked up until the completion of the control cycle. The relay 2PBR at station A is picked up under these conditions by the energization of a circuit extending from (+), including back contact 65 of relay 1CR, front contact 66 of relay LO, front contact 67 of relay PBP, front contact 68 of relay LP, back contact 69 of relay RC, front contact 70 of relay L, back contact 71 of relay RM, front contact 72 of relay LV, lower winding of relay 2PBR, back contact 73 of relay 2G, front contact 74 of relay 2R, contact 75 of push button 2RPB in its depressed position, and lamp 2RK, (−). The resistance of the lower winding of the relay 2PBR is sufficient to prevent the energization of the lamp 2RK sufficiently for illumination of that lamp at this time. The inclusion of the lamp 2RK in the pick up circuit for relay 2PBR is provided as a checking means to check that the lamp 2RK is not burned out.

When the relay 2PBR is picked up, it is maintained picked up by a stick circuit extending from (+), including front contact 76 of relay LO, back contact 77 of relay RMP, front contact 78 of relay 2PBR, upper winding of relay 2PBR, front contact 79 of relay 2PBR, and back contact 80 of relay 1PBR, to (−). It will be noted from the pick up and stick circuit organization as illustrated in Fig. 5 for the relay 2PBR that the circuits are so organized as to provide respective pick up and stick buses 81 and 82 to which the respective pick up and stick circuits are connected for the relays PBR for the other flight altitudes at station A. It is therefore to be understood that the relays PBR for the other flight altitudes at station A are energized from these pick up and stick circuit busses in the manner comparable to that which has been shown and described specifically with reference to the control of the relay 2PBR.

In response to the picking up of relay 2PBR, for example, in initiating the transmission of a control from station A, the stick circuit that has been described for the relay PBP (see Fig. 7A) is opened at back contact 44 to cause that relay to be dropped away. Because of the relay PBP having slow dropping away characteristics, however, the relay RC, which has its pick up circuit closed by the picking up of relay 2PBR, is picked up through a front contact 83 of relay 2PBR before the front contacts of the relay PBP are opened. The circuit by which the relay RC is picked up under these conditions extends from (+), including front contact 84 of relay LV, back contact 85 of relay RM, front contact 86 of relay PBP, front contact 83 of 2PBR, winding of relay RC, and front contact 87 of relay LO, to (−). The picking up of relay RC closes a stick circuit at its front contact 88 to shunt front contacts 86 and 83 of relays PBP and 2PBR respectively out of the circuit that has just been described. Thus the relay PBP is dropped away at the station initiating transmission at the beginning of the cycle, and the relay RC is picked up, the circuits for the relay RC being so organized as to maintain that relay picked up throughout the first half of the cycle as called for by the sequence chart of Fig. 9A. The picking up of relay RC causes the relay LP to be dropped away by the opening of back contact 52 in the stick circuit for relay LP which has been described.

The picking up of relay RC at station A when a control is designated for transmission from that station, is effective to open line B and thus initiate conditioning at the beginning of the cycle at station B. Thus at station B, the deenergization of line B causes the dropping away of relay L as is shown in the sequence chart of Fig. 10A, and the dropping away of this line relay causes the picking up of the relay RM.

Station B is thus conditioned for receiving the message that is to be transmitted from station A. The relay LP at station B is being deenergized by the picking up of relay RM, and the picking up of relay 1C in response to the picking up of relay RM causing the dropping away of the normally energized stepping relays and the subsequent picking up of the relay RMP to complete the conditioning at the start of the control cycle at station B.

To consider more specifically the circuit organization providing this mode of operation, assuming the apparatus of Figs. 7A, 7B, and 7C to be provided for station B, the dropping away of relay L (see Fig. 7B) because of the opening of line B at station A, closes a circuit for the relay RM (see Fig. 7A). The circuit by which the relay RM is picked up under such conditions extends from (+), including back contact 89 of relay RMP, front contact 90 of relay LO, front contact 91 of relay LP, back contact 92 of relay RC, back contact 93 of relay L, and winding of relay RM, to (−). This relay when picked up is maintained picked up by its stick circuit which extends from (+), including back contact 89 of relay RMP, front contact 94 of relay RM, and winding of relay RM, to (−). Prior to the opening of this stick circuit by the picking up of relay RMP during the first half of the cycle, the stepping relays are dropped away in a manner to be hereinafter described, and by the dropping away of the relay LV, another stick circuit is established for the relay RM including back contact 95 of relay LV and front contact 96 of relay RM.

Relay RM in picking up closes a pick up circuit for relay 1C (see Fig. 7B) extending from (+), including back contact 97 of relay 1CR, front contact 98 of relay RM, front contact 99 of relay LV, back contact 100 of relay RMP, back contact 101 of relay RC, and upper winding of relay 1C, to (−). This relay 1C when picked up is maintained picked up by the stick circuit for its lower winding extending from (+), including front contact 102 of relay RM, back contact 103 of relay 2C, front contact 104 of relay 1C, and lower winding of relay 1C, to (−). Thus by this stick circuit the relay 1C is maintained picked up subsequent to the opening of its pick-up circuit at back contacts 34 and 100 of relay RMP when that relay is picked up. Relay 1C is maintained picked up until such time as when a pick-up circuit is established for the relay 2C.

The relay RM is also effective in picking up to deenergize the relay LP at station B (see Fig. 7A) by the opening of its circuit at back contact 51. It will thus be noted that the relay LP is dropped away at the beginning of a cycle at both stations, it being dropped away at the transmitting station by the opening of back contact 52 of relay RC, and it being dropped away at the receiving station by the opening of its circuit at back contact 51 of relay RM.

In accordance with the picking up of relay 1C at station B, the opening of its back contact 55 (see Fig. 7C) deenergizes the first stepper IV by opening its stick circuit, and thus initiates the cascade of all of the stepper relays V so that they are all successively dropped away, the stick circuit for each stepper relay being dependent for energization upon a front contact of the stepper relay for the preceding step. When the last step relay LV is dropped away at station B, a circuit is closed for the picking up of relay RMP (see Fig. 7A) extending from (+), including back contact 105 of relay LV, front contact 106 of relay RM, and winding of relay RMP, to (—). The picking up of this relay establishes a stick circuit at front contact 107 to shunt the back contact 105 of relay LV out of the circuit just described.

The picking up of relay RM at station B during the conditioning period at the beginning of the cycle is also effective to interrupt line A. This is accomplished by the opening of the circuit at station B connecting the wires 36 and 37 (see Fig. 7B) at back contact 31 of relay RM.

At station A, the line relay L is dropped away because of the deenergization of line A, and the dropping away of relay L at station A causes the picking up of relay IC at that station by the energization of a circuit extending from (+), including front contacts 108, 109, 110, 111, 112, 113, 114, and 115 of relays LV, 7V, 6V, 5V, 4V, 3V, 2V, and IV respectively, back contact 116 of relay 2C, back contact 117 of relay L, front contact 101 of relay RC, and upper winding of relay IC, to (—). The closure of front contact 118 of relay IC at station A establishes a stick circuit to shunt back contact 117 of relay L out of the circuit that has just been described so as to maintain the relay IC picked up until there is a change in the condition of the stepper relays.

*Stepping*

It has been considered that line A is opened by station B under the assumed conditions during initiation of a cycle. This condition persists until the stepper relays at station B, including the last step relay LV, are dropped away. The relay LV in dropping away at station B closes a pick-up circuit for relay ICR (see Fig. 7A) which extends from (+), including back contact 105 of relay LV, front contact 106 of relay RM, back contact 119 of relay 2CR, and winding of relay ICR, to (—). Relay ICR in picking up at station B closes line A by establishing a connection between wires 36 and 37 (see Fig. 7B) including front contact 30 of relay LO, front contact 31 of relay RM, and front contact 120 of relay ICR. This is the first of a series of stepping pulses to be transmitted over line A from station B to station A as is illustrated in the sequency chart of Fig. 10A.

Relay ICR in picking up closes an obvious circuit at front contact 121 (see Fig. 7A) to cause the picking up of relay 2CR, and the relay 2CR in picking up deenergizes relay ICR by opening its circuit at back contact 119. The relay ICR after being deenergized is maintained picked up by reason of the adjustable resistor 122 and rectifier 123 combination shunted across its winding for a time interval governing the duration of the first stepper pulse. It is therefore provided that the resistor 122 and rectifier 123 shunted across the winding of relay ICR determines the duration of each stepping pulse to be transmitted from station B over line A to station A. When the relay ICR becomes dropped away at the end of this first pulse, it opens the circuit of line A at its front contact 120 (see Fig. 7B) and thus terminates the first of the stepping pulses. In the dropping away of relay ICR, the circuit for relay 2CR (see Fig. 7A) is opened at front contact 121, and thus this relay becomes dropped away after a time interval determined by the adjustable resistor 124 and rectifier 125 combination that is shunted across in winding of that relay. It is therefore provided that the drop away time of the relay ICR measures the duration of each of the stepping pulses transmitted over line A from station B under the assumed conditions, and the relay 2CR, by its slow drop away characteristics, determines the duration of the "off" periods that exist between the respective stepping pulses that are transmitted.

Relay ICR, in picking up at the beginning of each stepping pulse at station B, is also effective at that station to pick up a stepping relay corresponding to the particular pulse that is initiated. That is, the picking up of relay ICR for initiation of the first stepping pulse is also effective to pick up the first stepper relay IV at station B, the second pulse to pick up the second stepper relay 2V, etc.

With reference to Fig. 7C, the first stepper relay at station B is picked up in response to the picking up of relay ICR by the energization of a circuit extending from (+), including front contact 126, of relay ICR, front contact 127 of relay RM, back contact 128 of relay 2C, front contact 129 of relay IC, back contact 130 of relay 2V, and upper winding of relay IV, to (—). A stick circuit is established for the lower winding of relay IV for maintaining that relay picked up as long as the last step relay LV is dropped away. This stick includes back contact 131 of relay LV, front contact 56 of relay IV, and the lower winding of relay IV. It will be noted that the relay 2V cannot be picked up at this time because the even numbered stepping relays require the relay 2C to be picked up in order that they may be energized. It is thus provided that one stepper relay is picked up for each stepping pulse that is transmitted from station B, the odd numbered stepper relays being picked up when relay IC is picked up during transmission of a pulse, and the even numbered stepper relays being picked up when the relay 2C is picked up during the transmission of a stepping pulse.

The relay 2C at station B is picked up in response to the dropping away of relay ICR, and the picking up of that relay deenergizes the relay IC by the opening of its stick circuit at back contact 103 (see Fig. 7B). The pick-up circuit by which the relay 2C is energized under these conditions extends from (+), including back contact 97 of relay ICR, front contact 98 of relay RM, back contacts 99, 132, 133, 134, 135, 136, and 137 of relays LV, 7V, 6V, 5V, 4V, 3V, and 2V respectively, front contact 138 of relay IV, back contact 139 of relay RC, and winding of relay 2C, to (—). Relay 2C when picked up under these conditions establishes a stick circuit at its front contact 103 whereby it is maintained picked up until the relay IC is subsequently picked up to open its back contact 104.

The initiation of the second step at station B and also the initiation of the second pulse transmitted over line A from that station is rendered effective in response to the picking up of relay ICR in a manner comparable to that which was described when considering the picking up of relay ICR to initiate the first of the stepping pulses. The second step relay 2V (see Fig. 7C) is picked up in response to the picking up of relay ICR at the beginning of the second pulse transmitted from station B, in accordance with relay 2C being picked up at that time, by the energization of a circuit extending from (+), including front contact 126 of relay 1CR, front contact 127 of relay RM, front contact 128 of relay 2C, front contact 140 of relay 1V, back contact 141 of relay 3V, and upper winding of relay 2V, to (—). Relay 2V when picked up is maintained picked up by the energization of its stick circuit which is closed at front contact 57 of relay 1V.

The termination of the second stepping pulse is accomplished by the dropping away of relay 1CR at station B, and that relay in dropping away applies pick-up energy to the relay 1C (see Fig. 7B). This pick-up energy is applied to relay 1C through back contact 97 of relay 1CR, front contact 98 of relay RM, back contacts 99, 132, 133, 134, 135, and 136 of relays LV, 7V, 6V, 5V, 4V, and 3V respectively, front contact 137 of relay 2V, back contact 101 of relay RC, and winding of relay 1C, to (—). The system is therefore conditioned so that the picking up of relay 1C to mark the beginning of the third stepping pulse can pick up the odd numbered stepping relay 3V in a manner comparable to the manner which has been described whereby the stepping relay 1V is picked up in response to the picking up of relay 1CR.

Having thus considered how the stepping is accomplished at the field station B which is also transmitting stepping pulses under the assumed conditions of operation of the system, consideration will now be given to the reception of such pulses at the station A which is assumed to be the station that is to transmit a message.

Stepping at station A is effected under these conditions in a slightly different manner from that described as being effective at station B, particularly in that the stepper relays V are dropped away for the successive steps, one for each step, rather than being successively picked up for the respective steps as has been heretofore described for the stepper at station B.

The stepping is initiated at station A when the line relay L is picked up in response to the transmission of the first stepping pulse over line A from station B. In response to the picking up of relay L at station A under these conditions, the relay 1V (see Fig. 7C) is dropped away because of the opening of its stick circuit at back contact 142 of relay L. The stick circuit by which the relay 1V is normally maintained picked up has been opened at back contact 55 by the picking up of relay 1C, and the relay 1V is maintained picked up only until the relay L is picked up at the beginning of the first stepping pulse to open the stick circuit including back contact 142 of relay L, front contact 143 of relay RC, back contact 144 of relay RM, front contact 145 of relay 1V, and upper winding of relay 1V. It is this last described stick circuit that is opened at the beginning of the first stepping pulse received over line A to permit the relay 1V to be dropped away.

Inasmuch as the relay 2C at station A is in its dropped away position at this time, the relay 2V is maintained picked up by its stick circuit which extends from (+), including back contact 146 of relay 2C, front contact 147 of relay RC, back contact 148 of relay RM, front contact 149 of relay 2V, and winding of relay 2V, to (—). Because of the relay 2V being maintained picked up under these conditions, the relays V for the following steps are maintained energized by their stick circuits in the same manner that has been described when considering the normal conditions of the system.

In response to the relay 1V being dropped away at station A, the relay 1C is deenergized (see Fig. 7B) by the opening of its stick circuit at front contact 115 of relay 1V. This relay when dropped away permits a pick-up circuit to be closed for relay 2C when relay L is dropped away at the end of the first stepping pulse. The circuit closed by relay L under these conditions extends from (+), including front contacts 108, 109, 110, 111, 112, 113, and 114 of relays LV, 7V, 6V, 5V, 4V, 3V, and 2V, respectively, back contact 115 of relay 1V, back contact 150 of relay L, back contact 151 of relay 1C, front contact 139 of relay RC, and upper winding of relay 2C, to (—). The closure of the stick contact 152 of relay 2C maintains that relay picked up until another stepping relay is dropped away.

With relay 2C picked up, the relay 2V is conditioned so that it is dropped away upon the picking up of the line relay L in response to the second stepping pulse that is received over line A. Thus with reference to Fig. 7C, with the relay 2C picked up and the relay 1C dropped away, the picking up of relay L opens the stick circuit for the upper winding of relay 2V at back contact 153 to cause the dropping away of that relay. The stick circuit for the lower winding of that relay has been opened upon the dropping away of relay 1V at front contact 57 during the preceding stepping pulse prior to the picking up of relay 2C, the back contact 153 of relay L in the stick circuit for the upper winding of relay 2V being effective to maintain the relay 2V picked up during the off period of line A which follows the first stepping pulse.

Upon the dropping away of relay 2V at station A in response to the second stepping pulse the relay 2C is deenergized (see Fig. 7B), relay 2C having its stick circuit opened at front contact 114 of relay 2V because of the dropping away of that relay.

When the line relay L at station A becomes dropped away upon termination of the second stepping pulse that is transmitted over line A from station B, the relay 1C is picked up, and the picking up of this relay conditions the third step relay 3V so that it can be dropped away upon the picking up of the line relay L in response to initiation of the third stepping pulse. With reference to Fig. 7B the circuit by which the relay 1C is energized at this time extends from (+), including front contacts 108, 109, 110, 111, 112 and 113 of relays LV, 7V, 6V, 5V, 4V and 3V respectively, back contact 114 of relay 2V, back contact 116 of relay 2C, back contact 117 of relay L, front contact 101 of relay RC, and upper winding of relay 1C, to (—). The front contact 118 of relay 1C shunts the back contact 117 of relay L out of the circuit just described so that the relay 1C is maintained picked up until the relay 3V is dropped during the third stepping pulse to open the circuit which has been described for relay 1C at front contact 113.

With reference to Fig. 7C, the picking up of relay L in response to the third stepping pulse causes the dropping away of the stepper relay 3V by the opening of the back contact 142 in the stick circuit for the upper winding of relay 3V. Relay 1C is thus in its picked up position at this time to open its back contact 154 and thus permit the relay 3V to be dropped away. Relay 4V is held up at this time because of the relay 2C being in its dropped away position to apply energy to the stick circuit for the even numbered stepping relays at back contact 146. Because of the relay 4V being maintained energized in this manner, the subsequent stepper relays and the last step relay LV are maintained by the stick circuits for their lower windings because of their cascade stick circuit organization.

After the line relay L at station A is dropped away upon termination of the third stepping pulse applied to line A, the relay 2C (see Fig. 7B) is picked up by the energization of a circuit extending from (+), including front contacts 108, 109, 110, 111, and 112 of relays LV, 7V, 6V, 5V, and 4V respectively, back contact 113 of relay 3V, back contact 150, of relay L, back contact 151 of relay IC, front contact 139 of relay RC, and upper winding of relay 2C, to (—). The back contact 150 of relay L is shunted by the front contact 152 of relay 2C upon the picking up of that relay so as to maintain the relay 2C picked up subsequent to the initiation of the fourth stepping pulse until the fourth step relay 4V is dropped away.

It is therefore provided that the fourth stepper relay 4V at station A is dropped away in response to the picking up of relay L during the fourth stepping pulse because of its stick circuit being opened at this time at back contact 153 of relay L and at back contact 146 of relay 2C. The dropping away of relay 4V deenergizes the relay 2C by opening its circuit at front contact 112.

Having thus considered the mode of operation of the stepper during its first four steps at the station A under conditions where it is assumed that a control has been designated for transmission from that station, it is to be understood that a similar mode of operation is effective for the following steps of the stepper, including the last step relay LV so that the stepper relays continue to be dropped away, one at a time, and one for each stepping pulse that is received over line A from station B, until the last step relay LV is dropped away.

With reference to the sequence chart of Fig. 10B, it will be noted that during the second half of the control cycle under consideration, the stepper relays at station B are successively deenergized, one for each stepping pulse that is received over line B as being transmitted from station A. Similarly with reference to Fig. 9B, it will be noted that the stepper relays at station A are successively picked up during the second half of the control cycle under consideration, one for each stepping pulse that is transmitted from that station over line B to station A, in a manner comparable to that which has been described for the picking up of stepping relays at station B during the first half of the cycle. The manner in which a shift is made in the conditioning of the cycle to initiate the steppers at the beginning of the second half cycle will be hereinafter considered.

*Message transmission*

Message transmission is by Baudot code using five code characters, each of which is respectively a "mark" or a "space," in accordance with the code that is to be transmitted. A mark is characterized by a sustained period of energization of the line circuit that is used for transmission during the particular time period with which that character is associated, and a space is characterized by lack of energization of the line circuit at a corresponding time. Thus according to the code chart of Fig. 11, different combinations of marks and spaces are set up for reservation and cancellation controls to be communicated for the respective flight altitudes. It will therefore be seen according to the code chart that twenty distinctive codes are used for communication of controls from station A to station B, and twenty distinctive codes are used for transmission of controls from station B to station A. This is true only when considering transmission from each station individually in that the circuits are so organized that the same codes can be used for transmission from both stations, provided they are not used for the same purposes. In other words, the same codes that are used for reservation controls for transmission from station A are used for transmission of cancellation controls from station B, and similarly the same codes that are used for cancellation controls transmitted from station A are used for reservation controls that are transmitted from station B. By transmission from the respective stations A and B in considering the codes in this manner, transmission is assumed to mean transmission in response to manual designation of the control to be transmitted at that station. That is, the retransmission of a message for checking purposes is not taken into consideration as this retransmission is always retransmission of the same code characters during the second half of the cycle as were transmitted during the first half of the cycle.

Referring again to the code chart, the controls that are herein described more specifically as typical of controls that can be communicated for other flight altitudes are specific to the second flight altitude. Thus the code that is assigned to the second flight altitude for transmission by station A in response to reservation designation at that station for that flight altitude comprises the characters "mark-space-mark-mark-mark" as the respective five digits of the message code. The code that is assigned to the same flight altitude for transmission by station A in response to cancellation designation at that station for that flight altitude comprises the respective characters "space-mark-mark-mark-space" as the five digits of the cancellation code. As is designated in the code chart, the first named of these codes is also used for transmission of a cancellation control when designated at station B for the second flight altitude, and the second named of these codes is used for transmission of a reservation control when designated at station B for the second flight altitude.

Although it is to be understood that other codes may be assigned and other means may be employed for use of the codes, it will be apparent as the description progresses that the arrangement of codes for dual use by the two stations facilitates the organization of the decoding circuits to require a minimum number of contacts for decoding relays and provides that the minimum number of code digits is required. It will be readily apparent that with the five digit code system that is employed, there are many unused codes, and thus a greater number of flight altitudes than the ten flight altitudes used in this embodiment of the present invention can be employed in the system if required without requiring an increase in the number of code digits.

With reference to Fig. 7B, a means is illustrated by which the code characters for reservation and cancellation controls are determined for the second altitude at station A. The selection of the code characters is made under these conditions by the relay 2PBR in combination with the relay 2G so that either a reservation or a cancellation code can be selected for transmission. If there has been no prior reservation made for that flight altitude, the magnetic stick relay 2G is in its dropped away position at this time when the relay 2PBR is picked up in response to the designation of a reservation control for the second flight altitude at station A, while the relay 2G is picked up at a time when it may be desirable to designate a cancellation control for that flight altitude, and under these conditions, the picking up of relay 2PBR with the relay 2G already picked up selects another combination of code characters as is called for by the code chart of Fig. 11 for cancellation control transmission. Thus another way to consider the selection of codes for transmission from station A is that the relay 2PBR is picked up in response to designation of either a reservation or a cancellation control for transmission, and it is determined by the position of the relay 2G for that flight altitude as to whether a reservation or a cancellation code is to be transmitted.

More specifically, the first character of a reservation code transmitted from station A for the second flight altitude is a mark according to the code table and is formed by the closure of front contact 155 of relay 2PBR in combination with the back contact 156 of relay 2G. If, on the other hand, a cancellation code is designated for the same flight altitude, at the same station, the first character of the code is a space because of there being an open circuit through back contact 156 of relay 2G. For the second character of the code transmitted in response to reservation designation, the relay 2G being in its dropped away position provides that the second character of the code is a space because of the front contact 157 of relay 2G being opened. For cancellation, however, a mark is required as the second character of the code so this character is provided in accordance with the closure of front contact 158 of relay 2PBR in combination with front contact 157 of relay 2G.

Inasmuch as the third character is a mark for either a reservation or a cancellation code for the second flight altitude when it is designated at station A, there is no conditional selection made by the relay 2G, and the closure of front contact 159 of the relay 2PBR during the transmission of either of the controls selects a mark for transmission. The same is true for the fourth digit of the code transmitted from station A for the second flight altitude, because this digit is a mark for both reservation and cancellation code.

The fifth and last character of a message code transmitted from station A is a mark for a reservation code and a space for a cancellation code. Thus the mark is transmitted for reservation because of the front contact 160 of relay 2PBR being closed in combination with the back contact 161 of relay 2G, while this connection is opened at back contact 161 of relay 2G to create a space as the fifth digit of the code when a cancellation control is transmitted.

Having thus considered the general manner in which codes are determined for transmission of messages from station A it is believed expedient at this time to consider how these same codes are applied for the opposite control purposes at station B. This selection is indicated by the code selection contacts of relay 2PBR and 2G at station B as shown in Fig. 8, it being understood that the circuit organization at station B is the same that is shown in Fig. 7B except that the code determining contacts of Fig. 8 are substituted for the code determining contacts as shown in Fig. 7B, and transmission is over line A from station B and reception is over line B from station A.

The object to be obtained by these code selection contacts for the second flight altitude at station B is that a reservation code be selected made up of the same characters that are used for a cancellation code that is transmitted from station A for the same flight altitude. Thus at station B, for reservation control transmission, the relay 2G (see Fig. 8) is dropped away and the relay 2PBR is picked up, and this combination of relay positions selects the reservation code for transmission having a space for its first digit because of front contact 162 of relay 2G being opened, a mark for its second digit because of back contact 163 of relay 2G being closed, marks for its third and fourth digits because of front contacts 164 and 165 of relay 2PBR being closed with no selection by the relay 2G, and the last digit of the code being a space because of the front contact 166 of relay 2G being opened.

For the cancellation code that can be transmitted from station B for the second flight altitude, the first digit must be a mark, and thus the front contacts 167 and 162 of relays 2PBR and 2G according to Fig. 8 are both closed; the second digit is selected as a space because of back contact 163 of relay 2G being opened; the third and fourth digits are determined as marks by the front contacts 164 and 165 of relay 2PBR being closed; and the last digit is determined as a mark because of the closure of front contacts 168 and 166 of relays 2PBR and 2G respectively. It is believed from these specific considerations of the manner in which the code connections are determined for a particular flight altitude at both stations A and B that it will be readily apparent to those skilled in the art how the respective conditions for the other flight altitudes can be set up, each digit of the codes for each of the other flight altitudes being determined by the relays PBR and G for that flight altitude, and the contact selections of these relays being bridged across the same bus wires 169 and 170 for the first digit, 169 and 171 for the second digit, 169 and 172 for the third digit, 169 and 173 for the fourth digit, 169 and 174 for the fifth digit, as are used for code determining purposes for the corresponding digits as shown in Figs. 7B and 8.

To consider a typical example as to how the code pulses of a message are actually transmitted according to the code selected by the relays PBR and G, it will be assumed that a reservation control has been designated at station A as has been described and the relay 2PBR has been picked up with the relay 2G in its dropped away position so that the message code "mark-space-mark-mark-mark" has been selected for transmission.

The mark for the first digit is initiated in response to the dropping away of the first stepper relay 1V, the dropping away of that stepper relay being effective to close line B for the transmission of the first digit of the message. Thus at station A a connection is established between the wires 36 and 37 through front contact 30 of relay LO, back contact 31 of relay RM, front contact 32 of relay RC, back contact 174 of relay 1V, front contact 175 of relay 3V, front contact 176 of relay 2V, front contact 155 of relay 2PBR, back contact 156 of relay 2G, wire 169 and the inductance 35. The line B remains closed until the dropping away of the relay 2C, which is rendered effective after the second stepper relay 2V has been dropped away. The dropping away of relay 2V opens the line circuit transmitting connection that has just been described at front contact 176, but the relay 2C has been picked up just prior to that time in a manner which has been described, and is illustrated by the sequence chart of Fig. 9A, so that the closure of its front contact 177 sustains energization of line B until the relay 2C is dropped away in response to the dropping away of the stepper relay 2V.

As a means for adjusting the duration of the odd numbered mark and space periods of the respective digits of a message code, the relay 2C has its winding shunted by the adjustable resistor 178 in combination with the rectifier 179 through front contact 180 of relay RC so that the drop away time of relay 2C subsequent to its deenergization by the opening of a contact of a stepper relay can be increased or decreased in accordance with whether it is desirable to increase or decrease the duration of the respective odd numbered mark or space characters of the message code.

Because of the second character of the message code being a space, the line B is held open subsequent to the termination of the first character until the relay 1C becomes dropped away, subsequent to the dropping away of the stepper relay 3V, for initiating the third message code character which is a mark. The relay 1C has a means associated therewith for adjusting the drop away time comparable to that which has been described as being provided for the relay 2C. More specifically, the adjustable resistor 181 and rectifier 182 combination are bridged across the upper winding of the relay 1C when the relay RC is picked up to close its front contact 180 so as to be able to adjust the duration of the respective even numbered marks and spaces in a message code according to the requirements of practice. The inclusion of the rectifier 182 as associated with the relay 1C, and the rectifier 179 as associated with the relay 2C renders the resistance shunts across the windings of the relays 1C and 2C relatively ineffective with respect to the pick up times of these relays.

The second digit of the message code under consideration is selected as a space because of the front contact 157 of relay 2G being opened, but the third character is a mark in accordance with the closure of front contact 159 of relay 2PBR. The connection that is established between the wires 36 and 37 for initiation of the mark as the third character of the message code is established through front contact 30 of relay LO, back contact 31 of relay RM, front contact 32 of relay RC, back contact 174 of relay 1V, back contact 183 of relay 2V, back contact 184 of relay 3V, front contact 185 of relay 5V, back contact 186 of relay 1C, front contact 187 of relay 4V, front contact 159 of relay 2PBR, wire 169, and inductance 35. This pulse is sustained until the relay 2C has been picked up, the relay 4V has been dropped away in response to the fourth stepping pulse received from station B, and the relay 2C has become deenergized in response to the dropping away of the stepper relay 4V. Thus with reference to the transmitting circuit, the front contact 188 of relay 2C which is in multiple with front contact 187 of relay 4V is closed prior to the dropping away of relay 4V, and thus it is the closure of back contact 186 of relay 1C that initiates the mark and the opening of front contact 188 of relay 2C that terminates the mark that is transmitted as the third digit of the code.

The fourth digit of the code under consideration is also a mark, and this mark is initiated as soon as the back contact 189 of relay 2C is closed. Therefore there is only the difference in time between the opening of the front contact 188 of relay 2C and the closure of the back contact 189 of that relay between the marks of the respective third and fourth digits of the code. It will therefore be understood that this time is very slight, and it is a matter of choice as to whether a momentary interruption of the line circuit is provided at this time in this manner, or whether the line circuit is sustained steadily energized for successive marks as can readily be accomplished by providing make-before-break adjustments of the front and back contacts of the relays 1C and 2C that are used in the transmitting circuits. A momentary interruption is indicated in the sequence charts of Figs. 9A, 9B, 10A, and 10B more particularly to indicate where one digit terminates and the next digit begins.

Connection between the line wires 36 and 37 for the mark of the fourth digit of the code is established through front contact 30 of relay LO, back contact 31 of relay RM, front contact 32 of relay RC, back contacts 174, 183, 184 and 190 of relays 1V, 2V, 3V, and 4V respectively, front contact 191 of relay 6V, front contact 192 of relay 5V, back contact 189 of relay 2C, front contact 193 of relay 2PBR, wire 169, and inductance 35. Subsequent to the initiation of this mark, the relay 1C is picked up in response to the dropping away of the line relay L, the stepper relay 5V is dropped away in the response to the picking up of the relay L when the fifth stepping pulse is received from station B, and the relay 5V in dropping away deenergizes the relay 1C, the dropping away of which terminates the fourth digit of the message code by opening the connection between the wires 36 and 37 at front contact 194. Because of the last digit of the message code under consideration also being a mark, connection is closed between the wires 36 and 37 upon the dropping away of relay 1C through front contact 30 of relay LO, back contact 31 of relay RM, front contact 32 of relay RC, back contacts 174, 183, 184, 190 and 195 of relays 1V, 2V, 3V, 4V, and 5V respectively, front contact 196 of relay 7V, back contact 197 of relay 1C, front contact 198 of relay 6V, front contact 160 of relay 2PBR, back contact 161 of relay 2G, wire 169, and inductance 35. This mark, like each of the other odd numbered marks of the code is sustained until relay 2C is picked up, the next stepper relay is dropped away, and the relay 2C is dropped away in response to the dropping away of the stepper relay. Thus in the transmitting circuit, the front contact 199 of relay 2C which is in multiple with front contact 198 of relay 6V, is closed prior to the opening of front contact 198 of relay 6V, so that the mark that is transmitted over line A is terminated by the opening of front contact 199 of relay 2C.

*Message reception*

Assuming that a message to reserve the second flight altitude is transmitted as has been heretofore described, consideration will now be given to the means for receiving the message at the other station, which in this case is at station B. The sequence of relay operations for the reception of this message at station B is shown diagrammatically in Fig. 10A.

It has been pointed out that the relays M (see

Fig. 7C) are used in the reception of the message, one relay M being provided for each digit of the message code, and each relay M being picked up during message reception, only provided that a mark is transmitted for the associated digit of the code.

Upon comparing the times of energization for message transmission of line B during the first half of the cycle under consideration with the times of stepping pulse energization of line A as illustrated in the sequence charts, it will be noted that each mark of the message is initiated during one stepping pulse and is terminated during the next stepping pulse. It is at the beginning of the second of these two stepping pulses that the relay M for the associated digit becomes energized upon reception of a mark. More specifically, for example, the first mark of the code is initiated during the first stepping pulse received at station A, and it is terminated near the end of the second stepping pulse received at that station. At station B, the picking up of relay 1CR to initiate the second stepping pulse as has been described is effective to energize the message relay 1M, provided that line B is energized at that time so that the relay L at station B is picked up. The circuit (see Fig. 7C) by which the relay 1M is picked up under these conditions extends from (+), including front contact 210 of relay 1CR, front contact 211 of relay L, front contact 212 of relay RM, back contact 213 of relay 1C, front contact 214 of relay 2C, front contact 215 of relay 1V, back contact 216 of relay 3V, contact 217 of the channel selector switch CS in its upper position, and winding of relay 1M, to (−). This relay when picked up is maintained picked up until the end of the cycle by a stick circuit extending from (+), including front contacts 218, 219, and 220 of relays RM, RC, and RMP in multiple, front contact 221 of relay 1M, and winding of relay 1M, to (−).

On account of the second digit of the code under consideration being a space, the relay 2M is not picked up, because at the time for its energization for the second digit of the code, line B is open, and thus the circuit for relay 2M is open at front contact 211 of relay L.

Relay 3M is picked up in response to the picking up of relay 1CR for initiation of the fourth stepping pulse when line B is energized for a mark by the energization of a circuit extending from (+), including front contact 210 of relay 1CR, front contact 211 of relay L, front contact 212 of relay RM, back contact 213 of relay 1C, front contact 214 of relay 2C, front contact 215 of relay 1V, front contact 216 of relay 3V, back contact 222 of relay 5V, contact 223 of the channel selector switch CS in its upper position and winding of relay 3M, to (−). This relay when picked up is maintained energized through its stick contact 224 until the end of the cycle.

Upon the reception of a mark as the fourth digit of the code under consideration, the relay 1C is picked up at that time, and the relay 1CR in picking up to initiate the fifth stepping pulse energizes the relay 4M by a circuit extending from (+), including front contact 210 of relay 1CR, front contact 211 of relay L, front contact 212 of relay RM, front contact 213 of relay 1C, front contact 225 of relay 2V, front contact 226 of relay 4V, back contact 227 of relay 6V, contact 228 of channel selector switch CS in its upper position, and winding of relay 4M, to (−). The closure of front contact 229 of relay 4M upon the picking up of that relay establishes a stick circuit to maintain the relay 4M picked up until the end of the cycle.

Upon initiation of the sixth stepping pulse, the relay 5M is picked up because of line B being energized for the last digit of the code. The circuit by which the relay 5M is energized under these conditions extends from (+), including front contact 210 of relay 1CR, front contact 211 of relay L, front contact 212 of relay RM, back contact 213 of relay 1C, front contact 214 of relay 2C, front contacts 215, 216, and 222 of relays 1V, 3V, and 5V respectively, back contact 230 of relay 7V, contact 231 of the channel selector switch CS in its upper position, and winding of relay 5M, to (−). This relay when picked up is maintained energized through its stick contact 232 until the end of the cycle.

*Message answer back*

Having conditioned the message receiving relays M for the respective five code digits at station B in accordance with message pulses received over line B from station A, consideration will now be given to the manner in which a so-called answer back message is transmitted from station B to station A during the second half of a cycle which checks the message that has been received at station B during the first part of the cycle, pulse for pulse, with the code that has been selected for transmission at station A in accordance with manual designation. It is to be understood that this answer back half of the cycle is different than as if a separate answer back cycle were transmitted in that the system never enters a period of rest, even momentarily, in shifting from the first half cycle to the second half cycle. This is clearly illustrated in the sequence charts of Figs. 9A, 9B, 10A, and 10B in that it is illustrated in these drawings that both lines A and lines B are opened during the shift from the first half cycle to the second half cycle, as compared to both of these line circuits being normally closed during a period of rest. Furthermore certain cycle control relays that are dropped away at the beginning of the cycle are not picked up until the cycle is completed. This is true of the relays LP at both stations, and it is also true of the relay PBP at the station where the control has been manually designated.

To condition the apparatus at station A, for receiving the answer back message, the relay RC is dropped away and the relays RM and RMP are dropped away at station B after completion of the first half of the cycle.

With reference to Fig. 7A, the relay RC at station A is dropped away under these conditions by the opening of front contact 84 of relay LV, and according to the sequence chart of Fig. 9A, this occurs in response to the last stepping pulse that is transmitted over line A from station B during the first half of the cycle. Upon termination of that pulse, the dropping away of the relay L at station A closes a pick-up circuit for relay RM. Such circuit extends from (+), including back contact 89 of relay RMP, front contact 90 of relay LO, back contact 233 of relay PBP, back contact 234 of relay LV, back contact 92 of relay RC, back contact 93 of relay L, and winding of relay RM, to (−). When relay RM is picked up under these conditions a stick circuit is established through back contact 95 of relay LV, and front contact 96 of relay RM, to maintain that relay picked up until the end of the cycle.

Upon the picking up of relay RM at station A, the relay RMP is picked up by the energization of a circuit extending from (+), including back contact 105 of relay LV, front contact 106 of relay RM, and winding of relay RMP, to (—). The closure of front contact 107 of relay RMP provides that the relay RMP is maintained picked up until the relay RM is dropped away to open its front contact 106 at the end of the cycle.

It will be readily recognized that with the relays RM and RMP picked up at station A, stepping pulses are transmitted from that station via line B to station B so that the stepping is effected at stations A and B for the last half of the cycle according to a mode of operation similar to that which has been described when considering the stepping more specifically.

At station B, the relays RM and RMP which have been picked up during the first half of the cycle are dropped away, and the relay RC is picked up at that station so as to condition the apparatus at station B for reception of stepping pulses transmitted over line B and for the simultaneous transmission of the answer back message over line A to station A.

With reference to Fig. 7A, the opening of back contact 95 of relay LV upon the picking up of that relay at station B at the time of transmission of the last stepping pulse of the first half of the cycle, causes the relay RM to be dropped away, and the dropping away of relay RM in turn effects the dropping away of relay RMP by opening its stick circuit at front contact 106. It will be noted that the dropping away of relay RM renders the pulse forming relays 1CR and 2CR inactive because of the opening of front contact 106.

The relay RC at station B is picked up in response to the dropping away of relay RM, the relay RMP being made sufficiently slow in dropping away so that the relay RC at station B can be picked up at the mid-point in the cycle through back contact 85 of relay RM and front contact 235 of relay RMP. With reference to Fig. 7A, the pick-up circuit for relay RC under these conditions extends from (+), including front contact 84 of relay LV, back contact 85 of relay RM, front contacts 86 and 235 of relays PBP and RMP respectively, winding of relay RC, and front contact 87 of relay LO, to (—). The picking up of relay RC under these conditions closes the stick contact 88 to shunt front contacts 86 and 235 of relays PBP and RMP out of the circuit just described, thus maintaining the relay RC picked up until the end of the cycle.

The relays M at station B that have been selectively picked up during the first half of the cycle are maintained picked up by their stick circuits so that they are effective to determine the respective five digits of the answer back code by selectively closing the line circuit for transmission of the respective marks and spaces over line A to station A in a manner quite comparable to the manner which has been described by which the contacts of relays 2PBR and 2G at station A have been effective to determine the respective marks that have been transmitted from station A during the first part of the cycle. Thus with reference to Fig. 7B, the answer back code characters are determined at station B in accordance with relay 2PBR at station B being in its dropped away position throughout the cycle, and in accordance with the relays 1M, 3M, 4M, and 5M being in their picked up positions at station B as the system enters the second half of the cycle.

It is thus provided that as the system enters the second half of the cycle the stepper relays at station B are dropped away successively, one for each step, in accordance with stepping pulses transmitted over line B from station A, and for each of the first five stepping pulses received at station B, an answer back mark is transmitted, provided such mark has been received at station B during the first half of the cycle.

The first digit of the answer back code for the control under consideration is a mark, and energization of line A for such mark is rendered effective at station B upon the dropping away of relay 1V because of a connection which is established between wires 36 and 37 (see Fig. 7B) through front contact 30 of relay LO, back contact 31 of relay RM, front contact 32 of relay RC, back contact 174 of relay 1V, front contact 175 of relay 3V, front contact 176 of relay 2V, front contact 236 of relay 1M, and the inductance 35. This mark is terminated upon the opening of front contact 177 of relay 2C, subsequent to the second stepper relay 2V having been dropped away to open front contact 176 in a manner corresponding to that which has been described for the termination of odd numbered marks when considering message transmission from station A.

Because of the second digit of the code being a space, the relay 2M has not been picked up during the preceding half cycle, to close front contact 237, and thus there is no line circuit connection for the second digit and such digit therefore becomes a space to correspond with the space that was originally included as the second digit of the message transmitted from station A. The third digit of the answer back code is a mark because of the closure of front contact 238 of relay 3M in the line circuit during the period for the transmission of that digit of the code, and similarly the respective fourth and fifth digits of the answer back code are marks which are transmitted over line A to station A by reason of the closure of the front contacts 239 and 240 of relays 4M and 5M respectively during transmission of the respective digits with which these relays are associated.

*Message execution*

According to this embodiment of the present invention, the message transmitted from the station which has designated the control for transmission is executed at the other station subsequent to the completion of the first half of the cycle. The execution of the control at the station that is transmitting, however, is dependent upon completion of the second half of the cycle so as to check that the control has been properly communicated. Thus, considering the typical operating condition that has been described, the designation at station A of a reservation for the second flight altitude is effective to energize the red lamp 2RK at station B (see Fig. 6) subsequent to the completion of the first half of the control cycle. This is in accordance with the reception of the code "mark-space-mark-mark-mark" which picks up relays 1M, 3M, 4M and 5M at station B.

Thus, under the above assumed conditions, the dropping away of the second step relay 2V at station B at the beginning of the second half of the cycle, closes a circuit for the energization of the upper winding of relay 2R (see Fig. 6) with a polarity to actuate the contacts of that relay to their dropped away positions. The circuit by which relay 2R is energized extends from (+), including front contact 241 of relay PBP, back contact 242 of relay 2V, front contact 243 of relay LV, front contact 244 of relay 1M, back contact 245 of relay 2M, front contacts 246, 247, and 248 of relays 3M, 4M, and 5M respectively, back contact 249 of relay 2PBR, front contact 250 of relay 2R, and upper winding of relay 2R, to (−). The actuation of relay 2R to its knocked down position opens the circuit that has just been described at its front contact 250.

In accordance with the knocking down of the relay 2R, the closure of its back contact 251 establishes a circuit for the energization of the red lamp 2RK which is provided on the control panel in a position comparable to the second flight altitude as is shown in Fig. 2. The circuit for the red lamp 2RK extends from (+), including back contact 251 of relay 2R, back contact 252 of relay 2G, normally closed contact 253 of the reservation push button 2RPB for that flight altitude, and lamp 2RK, to (−). The energization of this red lamp indicates to the controller at the tower station B that the second flight altitude has been reserved by the airways controller at station A. It is also an indication that the controller at the tower can expect to be required to take over supervision from the airways controller of an airplane flight that is to arrive at this flight altitude.

Considering now the manner in which an indication is set up on the airways controller's board at station A in response to the designation of the reservation on that board for the second flight altitude, reference is made to Fig. 5, and the mode of operation is somewhat different than at station B in that it is the green lamp 2GK for the second flight altitude that is to be energized rather than the red lamp 2RK at that station, because the airways station A is the station at which it has been assumed the reservation push button 2RPB was actuated. In accordance with this button having been actuated, the push button repeater relay 2PBR at station A has been heretofore described, and thus the circuits for relays 2R and 2G are so conditioned that the reception of the check code will be effective to actuate both of these relays, relay 2R being actuated to its knocked down position and relay 2G to its picked up position, upon execution subsequent to the completion of the reception of the check code. This execution is rendered effective at the time when the last step relay LV is picked up at station A at the end of the cycle.

When relay LV is picked up at the end of the cycle at station A, a circuit is closed for the energization of the upper winding of relay 2R with a polarity to knock down that relay extending from (+), including back contact 254 of relay PBP, front contact 255 of relay RMP, front contact 256 of relay LV, front contact 257 of relay 1M, back contact 258 of relay 2M, front contacts 259, 260, and 261 of relays 3M, 4M, and 5M respectively, front contact 262 of relay 2PBR, front contact 263 of relay 2R, and upper winding of relay 2R, to (−). It will be noted that this circuit can be closed only provided that the relays 1M, 3M, 4M, and 5M are picked up and the relay 2M is dropped away in correspondence with the code that has been transmitted. Thus if a check code having any different characters is received, the relay 2R cannot be actuated and therefore the red or green lamp associated with the flight altitude for the button that has been actuated cannot be energized, this being an indication to the controller that there has been an error in the communication of the designated control. It will be noted that because of there being only one relay PBR picked up at station A at that time, the reception of a non-corresponding check code cannot be effective to energize the lamps associated with any other flight altitude at that station. The opening of front contact 263 of relay 2R upon actuation of that relay to its knocked down position opens the circuit that has been described for the energization of that relay, but does not interrupt a circuit by which the relay 2G is energized with a polarity for the picking up of that relay.

The circuit by which the relay 2G is energized under these conditions extends from (+), including back contact 254 of relay PBP, front contact 255 of relay RMP, front contact 256 of relay LV, front contact 257 of relay 1M, back contact 258 of relay 2M, front contacts 259, 260, and 261 of relays 3M, 4M, and 5M respectively, front contact 262 of relay 2PBR, front contact 264 of relay 2PBR, and upper winding of relay 2G, to (−).

The green lamp 2GK is energized in accordance with the actuation of the relays 2R and 2G as has been described by an obvious circuit including back contact 64 of relay 2R and front contact 265 of relay 2G.

It should be readily apparent from the circuit organization shown in Figs. 5 and 6, and from the description as it has been set forth, that a similar mode of operation is accomplished with respect to each of the other flight altitudes, the numerals from 1 to 10 inclusive being associated with the output wires of the respective decoding fan circuits as indicative of their connection to apparatus for corresponding flight altitudes in a manner similar to that which has been fully disclosed for the second flight altitude.

Clear-out

Assuming that the system has completed the stepping and the transmission of a message, together with the recheck of the message code as has been heretofore described, the system then enters a clear-out period during which the relays are restored to their normal conditions of rest. This clear-out period in general is initiated by the picking up of the last step relay LV at each of the stations.

With reference to Fig. 7A, the picking up of relay LV at station A at the end of the above described operating cycle opens one stick circuit for the relay RM at back contact 95, but the relay RM is held up momentarily by its other stick circuit until that stick circuit is opened at front contact 266 upon the dropping away of relay 1CR. Relay RM when dropped away opens the stick circuit for the relay RMP at front contact 106, this contact also being in the control circuit for the relay 1CR so as to render the relays 1CR and 2CR inactive. After the relay RMP has been dropped away, line B is closed at station A because of the closure of a circuit that has been described as being normally effective to connect the line wires 36 and 37 (see Fig. 7B).

In accordance with the dropping away of relay RMP at station A during the clearout period, the stick circuit by which the push button repeater relay 2PBR (see Fig. 5) has been held up is interrupted upon the shifting of contact 77 so that this relay is dropped away. It will be readily apparent that contact 77 is effective when shifting to its dropped away position to restore any push button repeater relay PBR that may be picked up at station A for a control cycle.

Upon the dropping away of relay 2PBR at station A, a pick-up circuit is conditioned for the relay PBP which has been deenergized throughout the above described control cycle. The pick-up circuit for relay PBP (see Fig. 7A) extends from (+), including back contact 42 of relay 4PBR, back contact 43 of relay 3PBR, back contact 44 of relay 2PBR, back contact 45 of relay 1PBR, winding of relay PBP, and back contact 277 of relay RMP, to (—). The closure of the stick contact 46 upon the picking up of relay PBP shunts the back contact 277 of relay RMP out of the circuit just described so that the relay PBP is maintained steadily energized during transmission of any control cycle that is initiated by station B. It will be noted that although the relay PBP when picked up would ordinarily permit the picking up of another relay PBR in response to push button actuation, the clear-out period must be completed before another relay PBR can be picked up because the closure of front contact 68 of relay LP is required in order that another relay PBR may be picked up to initiate another cycle of operation.

At station B, the stepping relays are successively dropped away during the second half of the above described cycle, and when the relay LV becomes dropped away, the stick circuit for the relay RC (see Fig. 7A) is opened at front contact 84 to cause the dropping away of that relay. When relay RC is dropped away at station B, with the relay PBP picked up because of transmission having been initiated by station A, a circuit is closed for the energization of the stepper relay IV (see Fig. 7C) to restore this stepper relay to its normally energized position. This circuit extends from (+), including front contact 267 of relay PBP, back contact 268 of relay LP, back contact 269 of relay RC, back contact 270 of relay RM, back contact 130 of relay 2V, and upper winding of relay IV, to (—). Upon the picking up of this relay, a stick circuit including back contact 55 of relay IC and front contact 56 of relay IV is closed to maintain this relay picked up until the initiation of another cycle of operation, the relays IC and 2C having become inactive because of the relays RC and RM being both in their dropped away positions.

The other stepper relays tumble up in succession at station B in response to the first stepper relay IV having been picked up as has been described, the picking up of each stepper relay being effective to condition a pick-up circuit for the next successive relay. Thus the relay 2V is picked up subsequent to the picking up of relay IV by the energization of a circuit extending from (+), including front contact 271 of relay PBP, back contact 272 of relay LP, back contact 273 of relay RC, back contact 274 of relay RM, front contact 140 of relay IV, back contact 141 of relay 3V, and upper winding of relay 2V, to (—). The picking up of this relay establishes a stick circuit which is closed at front contact 57 of relay IV to maintain this relay picked up during a period of rest. Relay 2V in picking up opens the pick-up circuit that has been described for relay IV at back contact 130 so that the stepper relay IV is entirely dependent upon its stick circuit which includes the lower winding of that relay. In a similar manner, the other stepper relays are successively restored to their normally picked up positions, including the last step relay LV.

Relay LV when picked up at station B closes a connection which has been described as being normally maintained between the line wires 36 and 37 (see Fig. 7B) at front contact 33, and thus the line A becomes energized at this time, completing the restoration to the normal conditions of the line circuits A and B.

In accordance with the picking up of the relay LV at station B, a pick-up circuit is closed for the relay LP (see Fig. 7A) extending from (+), including front contact 275 of relay LV, front contact 276 of relay L, back contact 51 of relay RM, back contact 52 of relay RC, back contact 53 of relay RMP, front contact 54 of relay LO, and winding of relay LP, to (—). When this relay is picked up, the closure of its stick circuit at front contact 50 restores the normal conditions of energization of this relay and completes the restoration to the normal state of rest of the apparatus at station B.

In accordance with the closure of line A at station B, the line relay L at station A is picked up, and in response to the picking up of this relay, the relay LP at station A is restored to its normally energized position by the energization of a circuit comparable to that which has just been described, and the picking up of the relay LP at station A is effective as at station B to complete the restoration of the apparatus at station A to its normal conditions.

Transfer of authority

The detailed description of the mode of operation as it has been heretofore set forth has been more particularly concerned with the setting up of a typical reservation that has been designated at the airways control center (station A) for the second flight altitude wherein a green lamp 2GK is energized on the panel 23 at the airways office because the control has been designated at that office, and it has been described how a red indicator 2RG is energized on the panel 23 at the tower station B to indicate to the tower approach controller that an airplane flight is approaching the tower under the supervision of an airways controller at the second flight altitude.

Upon the tower approach controller at station B making contact with the airplane approaching at the second flight altitude by use of his radio communication organization, he may then take over the authority of supervision of the flight, and should indicate his taking over supervision to the airways controller at the control center by actuating his reservation control button for the particular second flight altitude that may be assumed to be involved. The actuation of the reservation button at the tower under these conditions changes the indication on the panel 23 (see Fig. 2) at the tower (station B) from the energization of a red indicator lamp 2RK to the energization of a green indicator lamp 2GK for the second flight altitude, and at the same time at the airways control center (station A), the green lamp 2GK on the airways panel 23 is extinguished and the lamp 2RK is illuminated. In this manner it is clearly indicated to the airways controller, that the tower approach controller has taken over authority for governing the airplane flight under consideration, and has made contact with the airplane involved.

With reference to the code chart of Fig. 11, the designation at station B for reservation for the second flight altitude causes the transmission of the reservation code "space-mark-mark-mark-space." The transmission of this code via the code communication system is accomplished by the same mode of operation that has been heretofore specifically described for the transmission of a reservation control from station A to station B, and therefore it is believed to be unnecessary to point out the specific mode of operation of the organization involved in the communication of this control.

After the first half of the control cycle has been completed so as to pick up the relays 2M, 3M, and 4M at station A in accordance with the code transmitted, an execution circuit is closed upon the dropping away of the second step relay 2V (see Fig. 5) in the second half of the control cycle whereby the relay 2G at station A is actuated to its knocked down position to extinguish the green lamp 2GK, and whereby the relay 2R is maintained actuated to its knocked down position so as to provide for the energization of the red lamp 2RK. This particular mode of operation is accomplished in view of the push button repeater relay 2PBR at station A being in its dropped away position because of the reservation control having been designated at station B.

The circuit by which the relay 2G is energized with polarity for actuation to its knocked down position extends from (+), including front contact 254 of relay PBP, back contact 278 of relay 2V, front contact 256 of relay LV, back contact 257 of relay IM, back contact 279 of relay 5M, front contacts 280, 281, and 282 of relays 4M, 3M, and 2M respectively, back contact 262 of relay 2PBR, back contact 264 of relay 2PBR, front contact 283 of relay 2G, and lower winding of relay 2G, to (—). The opening of front contact 265 of relay 2G extinguishes the lamp 2GK, and the opening of front contact 283 of the relay 2G because of its becoming knocked down opens the circuit that has just been described. Energy is applied from the circuit that has just been described for relay 2G to the contact 263 of relay 2R for the energization of the upper winding of that relay with a polarity to cause that relay to be knocked down, but this front contact 263 is already open because of the assumed operating conditions on account of the relay 2R having been knocked down by the setting up of the reservation at the airways control center at a prior time. Therefore, upon closure of back contact 265 of relay 2G, the red lamp 2RK becomes energized by a circuit extending from (+), including back contact 64 of relay 2R, back contact 265 of relay 2G, normally closed contact 75 of push button 2RPB, and lamp 2RK, to (—).

In accordance with the procedure for checking each message that is transmitted, the relays 2M, 3M, and 4M by being picked up at station A, select an answer back check code to be transmitted from station A to station B during the second half of the control cycle. Upon completion of the transmission of the answer back code, an execution circuit is closed as is shown in Fig. 6 for the picking up of the relay 2G extending from (+), including, back contact 241 of relay PBP, front contact 284 of relay RMP, front contact 243 of relay LV, back contact 244 of relay IM, back contact 285 of relay 5M, front contacts 286, 287, and 288 of relays 4M, 3M, and 2M respectively, front contact 249 of relay 2PBR, front contact 289 of relay 2PBR, and upper winding of relay 2G, to (—). The relay 2G in becoming picked up opens the circuit by which the red lamp 2RK has been energized at back contact 252 and closes a circuit including back contact 251 of relay 2R and front contact 252 of relay 2G for the energization of the green lamp 2GK on the panel 23 at station B. In this way a visual indication of the transfer of authority from the airways controller to the tower approach controller is provided on their respective panels 23.

It will be obvious that the tower approach controller being first advised by a red indicator lamp that an airplane flight is approaching the tower, will not actuate the reservation push button for that flight altitude with the idea of obtaining a clearance light for bringing another airplane flight into the same flight altitude. That is, according to the normal mode of operation in use of the control panel, when a controller desires to reserve a flight altitude for an airplane flight he actuates the reservation button for any particular flight altitude he desires to reserve which is not indicated by the energization of an associated red or green lamp as being in use for another airplane. It is therefore a distinctive indication to the tower controller by the energization of the red lamp for a particular flight altitude that he may take over authority for that flight, but his obtaining a green aspect by the actuation of the reservation button for that flight altitude can only indicate the transfer of authority.

By this arrangement, if a red indicator lamp were to be burned out so as not to be illuminated when the associated flight altitude is reserved by an airways controller, it is desirable that the circuit organization be such that the tower approach controller cannot inadvertently obtain a green aspect for that flight altitude, and thereby inadvertently cause a dangerous condition by permitting two airplanes to be given clearance for the same flight altitude. It is thus provided that in order to obtain a green aspect for any flight altitude, the circuit for the red lamp RK for that flight altitude is checked, and if such lamp is burned out, the actuation of the reservation push button RPB for that flight altitude is ineffective to cause the execution of a control. Thus upon the controller failing to initiate the communication of a control by actuation of a reservation button, it is called to his attention that the red lamp RK for that flight altitude may be burned out. A similar circuit organization is provided at stations A (see Fig. 5). It will therefore be seen that the burning out of a red lamp RK at either station A or station B cannot set up a dangerous condition wherein a reservation clearance can be obtained by the controllers at both towers for the same flight altitude as indicated by the energization of a green lamp GK for that flight altitude at both stations.

A circuit by which the typical red lamp 2RK (see Fig. 6) for the second flight altitude at the tower station B is checked has been described when considering the pick-up circuit for the push button repeater relay 2PBR in accordance with designation of a reservation control in that the lamp 2RK is included in series with the lower winding of that relay. The resistance of the lower winding of the relay 2PBR is sufficiently high so that the lamp 2RK does not become illuminated in response to this energization, but should the lamp 2RK become burned out, the relay 2PBR obviously cannot be picked up in response to reservation control designation, and because it cannot be picked up, the transmission of a reservation control in response to actuation of the button 2RPB cannot be rendered effective until the burned out lamp has been replaced.

The circuits for the control of the push button repeater relay 2PBR at station A (see Fig. 5) for energization upon reservation designation are slightly modified from the circuit organization that has been described for the picking up of the corresponding relay at station B in that the inclusion of front contact 74 of relay 2R in the pick-up circuit of the relay 2PBR prevents the picking up of that relay in the case of designation of a reservation control for the second flight altitude, provided that the relay 2R is in its knocked down position in accordance with that particular flight altitude being already reserved. In other words, there is no condition present requiring distinctive indication as to transfer of an authority from the tower controller to the airways controller, as this is not required in accordance with the mode of operation in directing air traffic, and therefore there is no occasion when an airways controller should obtain a green aspect for a flight altitude that has already been reserved by station B. It is thus provided that if an airways controller fails to recognize the energization of a red lamp RK for a particular flight altitude and proceeds to designate reservation for that flight altitude, no control is transmitted, and the conditions with respect to indication as to the reservation of that flight altitude are not changed from their previous conditions. This mode of operation in itself will be recognized as providing protection against inadvertently obtaining clearance for a reserved flight altitude in case the red lamp RK for that flight altitude is burned out, in that the relay R for that flight altitude would be dropped away under these conditions, and even though the check of the indicator lamp RK in the pick-up circuit for the associated push button repeater relay PBR were not included, the inclusion of front contact 74 of that relay R in the pick-up circuit of the associated relay PBR would prevent the designation of the reservation from being rendered effective and the obtaining of a green aspect for a flight altitude that had been reserved by a prior designation.

*Cancellation*

A typical mode of operation in the controlling of an airplane flight in approach of an airport has been considered wherein the second flight altitude has been reserved for the airplane flight, and wherein the transfer of authority from the airways controller to the tower approach controller has been indicated on the respective controllers' panels 23. It will now be assumed that the airplane has been landed, or has been vacated from the holding stack or fix indicated by the panel 23 at the tower approach controller's office, and thus the flight altitude for that fix may be cancelled. This is accomplished under the above assumed conditions by the actuation of the cancel button 2CPB in panel 23 (see Figs. 2 and 6) at station B.

In accordance with this designation, the push button repeater relay 2PBR at station B is picked up to initiate transmission during a control cycle by the energization of a circuit extending from (+), including back contact 290 of relay ICR, front contact 291 of relay LO, front contact 292 of relay PBP, front contact 293 of relay LP, back contact 294 of relay RC, front contact 295 of relay L, back contact 296 of relay RM, front contact 297 of relay LV, lower winding of relay 2PBR, front contact 298 of relay 2G, and contact 299 of the cancellation button 2CPB, to (−). It will be noted that this circuit can be closed only provided that the relay 2G is picked up to close its front contact 298. This means that the only controller who can effect cancellation of a flight altitude reservation is a controller at the particular station at which such reservation has last been designated. In other words, the general mode of operation is that a cancellation control can be rendered effective by actuation of a cancellation button CPB only provided that the green lamp GK for that flight altitude and on the same panel 23 is energized in accordance with the associated relay G being picked up.

The designation of the cancellation control at station B as has been described for the second flight altitude causes the transmission to station A of the code "mark-space-mark-mark-mark" according to the code chart of Fig. 11, such code being selected by the relays 2G and 2PBR at station B being in their picked up positions and thus closing respective channels corresponding to the marks of the code as shown in Fig. 8. It will thus be seen that according to Fig. 8 the first digit of the code is a mark because of the connection of wires 170 and 169 through front contacts 167 and 162 of relays 2PBR and 2G respectively. The back contact 163 of relay 2G is open so that there is no connection for the second digit of the code between wires 171 and 169, and thus such digit is a space. The third and fourth digits are obviously marks because of the contacts 164 and 165 being respectively closed for these digits, and the last digit is a mark because of the connection of wire 174 and wire 169 through front contact 168 of relay 2PBR and front contact 166 of relay 2G. It will be recognized that this code which is transmitted in response to cancellation designation at station B is the same code which is used according to the code chart of Fig. 11 as has been described for reservation designation at station A.

In accordance with the reception of the cancellation code at station A, the relays 1M, 3M, 4M, and 5M are respectively picked up as the code is received, and subsequent to their energization, a control is executed at the beginning of the second half of the control cycle wherein the relay 2R (see Fig. 5) is restored to its picked up position, and the lamp 2RK is extinguished by the opening of back contact 64 of relay 2R. The relay 2R is picked up under these conditions in accordance with the relay 2PBR at station A being dropped away during this cycle of operation. The circuit for the energization of relay 2R at station A extends from (+), including front contact 254 of relay PBP, back contact 278 of relay 2V, front contact 256 of relay LV, front contact 257 of relay 1M, back contact 258 of relay 2M, front contacts 259, 260, and 261 of relays 3M, 4M, and 5M respectively, back contact 300 of relay 2PBR, and lower winding of relay 2R, to (−).

In accordance with the relays 1M, 3M, 4M, and 5M at station A being picked up as a result of the first half of the control cycle, these relays select corresponding check back code characters for the second half of the cycle in a manner comparable to that which has been specifically described for the check back of a code that has been assumed to be transmitted from station A to station B. Thus the relays 1M, 3M, 4M, and 5M at station B (see Fig. 6) are picked up as a result of transmission of the second half of the cancellation control cycle, and therefore when the reception of the code at station B is completed, an execution circuit is closed whereby the relay 2G at station B is energized with a polarity to actuate that relay to its knocked down position, and whereby the relay 2R is energized with a polarity to be picked up and thus to open its back contact 251 which is used for the application of energy to the indicator lamps for the second flight altitude. The circuit by which the relay 2G is energized with reverse polarity so as to be knocked down extends from (+), including back contact 241 of relay PBP, front contact 284 of relay RMP, front contact 243 of relay LV, front contact 244 of relay IM, back contact 245 of relay 2M, front contacts 246, 247, and 248 of relays 3M, 4M, and 5M respectively, front contact 301 of relay 2PBR, front contact 302 of relay 2PBR, front contact 303 of relay 2G, and lower winding of relay 2G, to (—). The actuation of this relay to its knocked down position opens its own circuit at front contact 303. The relay 2R is energized at the same time through the same circuit selection decoding network, its lower winding being energized through front contact 301 of relay 2PBR with a polarity to cause the picking up of that relay.

According to the above described mode of operation, cancellation has been effected for the second flight altitude at both stations B and A, and the indicator lamps associated with this flight altitude at both of these stations have been extinguished. It will be readily understood that a similar mode of operation is accomplished in cancellation for other flight altitudes, and that a similar mode of operation is effective when the cancellation is initiated from station A rather than from station B. Station A, however, cannot initiate cancellation except for the respective flight altitudes that have been last reserved by that station and are thus indicated by the energization of the green lamps GK. Therefore reservation can be canceled by station A only prior to the transfer of authority for supervision of the corresponding airplane flights to the authority of the tower controller at station B.

*Simultaneous starts*

From the mode of operation as it has been described, it will be noted that a relay LP is dropped away at the beginning of each cycle at each of the stations, irrespective of which of the stations is transmitting. This relay when dropped away prevents the interruption of the cycle that has been initiated by the subsequent actuation of a reservation or cancellation button in that it is effective to open the pick-up circuits for the push button repeater relays PBR at the associated station. Thus, at station A, the dropping away of relay LP opens the pick-up bus for the relays PBR at that station at front contact 68 (see Fig. 5). Similarly at station B, the dropping away of the relay LP at that station also removes energy from the pick-up bus for the relays PBR at that station as is shown in Fig. 6.

The condition may arise, however, when the controllers at the respective stations A and B may both actuate control buttons at exactly the same time so as to cause a simultaneous start at both stations. Under these conditions, a relay PBR may be picked up at each station, and in accordance therewith the relay RC at the associated station is picked up to condition the apparatus for the reception of stepping pulses. This being the case, both stations are conditioned to receive stepping pulses and neither station is conditioned to transmit them so a lock up condition occurs wherein both line circuits are held open because of the relays RC at both stations being picked up.

Under these conditions, with reference to Fig. 7A, the relay LO at each station becomes steadily deenergized because of its circuit being opened at front contact 47 of the associated relay L and at back contact 49 of the associated relay RC. When this relay is dropped away, the lamp LK at that station becomes energized upon the closure of back contact 304 of relay LO to indicate to the controller that failure of transmission is due to a simultaneous start from both stations.

The relay LO in picking up is effective to restore the relays that have been picked up at that station so as to restore the system to its normal conditions. Each relay LO in being dropped away effects the restoration of the relay RC at that station by opening its front contact 87 (see Fig. 7A), and the opening of front contact 76 of relay LO (see Fig. 5), at station A, and a corresponding contact at station B, opens the stick circuit bus for the push button repeater relays PBR so that the particular push button repeater relays that have been picked up due to the controls designated are restored to their normally deenergized positions.

It will be noted that the closing of the line circuit governed by each of the stations is dependent upon the picking up of the relay LO at that station to close front contact 30 (see Fig. 7B. Thus upon actuation of the reset button (see Fig. 7A) at each station, the relay LO at that station is picked up, and the picking up of that relay closes the line circuit which it governs for transmitting purposes so as to complete the restoration to the normal conditions of rest of the system. The system is thus conditioned so that it can be used for the transmission of controls, it being assumed that one or the other of the stations would gain control of the system for the transmission of the first control because of one or the other of the controllers being first to designate a control for transmission after the relays LO have been picked up at both stations.

*Adjustments for propagation time*

The transmitting conditions which have been assumed in preparing the sequence charts of Figs. 9A, 9B, 10A, and 10B were assumed to be ideal wherein no appreciable propagation time for the line circuits has been taken into consideration. It may be, however, that in the use of the system over line wires for considerable distances there may be a material amount of propagation time that will have to be taken into consideration, particularly in that the line circuit may have to include repeater stations and other time consuming apparatus which may either call for the slowing down of the stepping operations in order to insure proper reception at the opposite end of each of the line circuits, or the system may be so adjusted that there is an extra-step delay employed in the reception of the message to compensate for time lost along the transmission line. This latter means of compensating for time lost in transmission is preferable where speed of transmission is a factor as it does not require the lengthening of the cycle by changing the rate of stepping, but rather provides that execution of the respective message digits be made on the second step following the step during which those digits are transmitted rather than on the first following step as has been described.

To accomplish this mode of operation, the channel selection switch CS of Fig. 7C at each station is actuated to its lower position so as to connect the respective message relays M to the next subsequent channels of the system. In this way, if the propagation time consumed is substantially that of the time required for one step of the system, no other adjustment need be made as the message pulses will merely be delayed one step along the line circuit from the conditions that have been considered, and thus the mode of operation will be the same as has been described, the channel switch CS in its downward position being effective to cause the relays M to properly respond to their particular associated digits of the code transmitted.

If, on the other hand, the propagation time is not sufficient to be comparable to the time of communication of one step, additional time delay may be inserted in the system to accomplish in effect the full step delay by the adjustment of the variable resistors 181 and 178 of Fig. 7B which are shunted across the relays 1C and 2C during message transmission and thus are effective to delay the application of the message pulses to the line circuit.

Although the code communication system of this embodiment of the present invention has been illustrated as being applied to the solving of a particular air traffic control problem, it is to be understood that there are many features of the code communication system that are readily adaptable to other conditions wherein code communication is required, particularly where it is desirable to check that the code characters have been received at the distant station for defining the same control as was designated for transmission. Such code communication system may be employed, for example, in the communication of switch and signal controls, and/or indications in a system where electrically controlled railway switches and signals are remotely located from a control office.

Although only a single specific embodiment has been shown and described in detail of a code communication system, it is to be understood that this form of the invention has been selected to facilitate in the disclosure of the invention rather than to limit the number of forms which the invention may assume, and it is to be understood that further alterations, adaptations, and modifications may be applied to the specific form shown to meet the requirements of practice without in any manner departing from the spirit or scope of the present invention except as limited by the appending claims.

What I claim is:

1. An air traffic control communication system connecting two stations comprising in combination, a control panel at each station for a particular fix along an airway, said panel having disposed thereon manually operable means for designating reservation of each flight altitude, and said panel having disposed thereon indicator lamps for each flight altitude, one indicator lamp being provided for indicating a reservation designated at that station and another indicator lamp being provided for indicating a reservation designated at the other station, a line circuit having a channel for each direction of communication between said stations, normally at rest code communication apparatus at each station effective in response to the designation of a reservation control at that station to transmit during the first half of a cycle a control code characteristic of the control designated over one of said channels and effective in response to the designation of a reservation control at the other station to transmit during the first half of a cycle stepper synchronizing pulses over that channel, said code communication apparatus being effective to reverse the direction of code transmission in the middle of a cycle to transmit stepper synchronizing pulses at the station at which the reservation control has been designated and to transmit a check code from the other station matching character for character with the code that has been received at that station during the first half of the cycle, and code receiving means at each station effective to energize said another indicator lamp in response to a reservation code transmitted from the other station and effective to energize said one indicator lamp in response to a check code transmitted from the other station, said code receiving means being effective to energize said one indicator lamp only provided that the check code received corresponds with the reservation code that has been transmitted.

2. An air traffic control system connecting two remotely spaced stations comprising in combination, a control panel at each station having manually operable means for designation of respective flight altitude reservations and having indication means for each flight altitude for distinctively indicating as to whether a reservation has or has not been made for that flight altitude, a two-channel line circuit connecting the two stations, one channel being provided for transmission in each direction, normally at rest code communication apparatus responsive to the actuation of said manually operable means at either station for simultaneously transmitting a control code characteristic of the reservation designated over one channel and stepping pulses over the other channel, said communication system being effective to actuate said indication means at the other station upon completion of the transmission of said control code, and check code communication means including said channels effective during each cycle to transmit a check code matching character for character with the reservation control code that is received at said other station, said check code communication means being effective to actuate said indication means at the station at which the reservation control has been designated, only provided that the check code corresponds with the reservation code that has been selected for transmission during that cycle in accordance with the actuation of said manually operable means.

3. An air traffic control system of communication between two remotely spaced stations for facilitating the control of airplane flights comprising in combination, a control panel at each station for a particular fix along an airways, said panel having disposed thereon manually operable means for designating reservation of each of a plurality of flight altitudes, and said panel having disposed thereon indicator lamps for each flight altitude, one indicator lamp being provided for indicating a reservation designated at that station, and another indicator lamp being provided for indicating a reservation designation at the other station, normally at rest code communication apparatus including a two channel line circuit effective to transmit in response to designation of a reservation at one station a code characteristic of that particular reservation over one of said channels from that station and effective to transmit stepper synchronizing pulses over the other channel from the other station, and receiving means at each station responsive to a reservation code transmitted from the other station for energizing said other indicator lamp and effective at the end of a cycle during which a reservation control has been transmitted from that station for energizing said one indicator lamp.

4. An air traffic control system of communicating between two remotely spaced stations comprising in combination, a control panel at each station having manually operable means disposed thereon for designation of respective flight altitude reservations, said control panel having indication means associated with each flight altitude for indicating as to whether or not a reservation has been made for that flight altitude by either station, a two-channel line circuit connecting the two stations, one channel being provided for transmission in each direction, code communication means at each station including said line circuit responsive to the actuation of said manually operable means at that station for simultaneously transmitting a control code characteristic of the reservation designated over one channel and stepping pulses over the other channel for synchronization of the communication apparatus at both stations, and code receiving means at each station effective to actuate said indication means for each flight altitude in accordance with the reception of the reservation control code transmitted from the other station characteristic of that particular flight altitude.

5. In an air traffic control system having two remotely located flight control stations, a control panel at each station for a particular fix along an airway, said control panel having disposed thereon manually operable means for designating a particular flight altitude and indicator lamps for that flight altitude, one indicator lamp being provided for indicating a reservation designated at that station and another indicator lamp being provided for indicating a reservation designated at the other station, a normally at rest code communication system including line circuit means connecting the two stations, a normally deenergized relay at each station for said flight altitude energized in response to the actuation of said manually operable means at that station and effective to initiate said code communication system into a cycle of operation for the transmission of a reservation code, and decoding means at each station distinctively conditioned in accordance with the code received at that station during a cycle of operation of said communication system, said decoding means being effective to energize said one indicator lamp or said another indicator lamp in accordance with whether or not said relay at that station is energized.

6. In an air traffic control system, two remotely spaced control stations, line circuits connecting the two stations, a control panel at each station for a particular fix along an airway, said control panel having disposed thereon manually operable means for designating reservation of each of a plurality of flight altitudes, and said panel having disposed thereon indicator lamps for each flight altitude, one indicator lamp being provided for indicating a reservation designated at that station and another indicator lamp being provided for indicating a reservation designated at the other station, indication control means including said line circuits effective in response to reservation designation at either station to energize said one indicator lamp at that station and said another indicator lamp at the other station associated with that flight altitude, said indication control means being ineffective in response to designation of a reservation control at one of said stations provided that said another indicator lamp for that flight altitude is burned out.

7. An air traffic control system of communicating indications between two remotely spaced stations for facilitating the controlling of airplane flights comprising in combination, a control panel at each station for a particular fix along an airway, said control panel having disposed thereon manually operable means for designating reservation of a particular flight altitude and having indicator lamps for that flight altitude, one indicator lamp being provided for indicating a reservation designation at that station and another indicator lamp being provided for indicating a reservation designation at the other station, a normally at rest code communication system including line circuit means connecting the two stations and operable when initiated through a cycle of operation for the transmission of a code characteristic of a reservation control, a normally deenergized relay at each station for said particular flight altitude responsive to the actuation of said manually operable means to initiate said code communication system into a cycle of operation to transmit a selected reservation control code, two magnetic stick relays for said particular flight altitude, one of said relays being effective to govern the energization of said indicator lamps, and the other of said relays being effective to select which of the two indicator lamps is to be energized, and decoding means at each station distinctively conditioned in accordance with the code received at that station during a cycle of operation of said communication system, said decoding means being effective to actuate said one relay to a position to affect the energization of one or the other of said indicator lamps, and to actuate said other relay to select as to which of said lamps is to be energized in accordance with whether or not said normally deenergized relay is picked up or dropped away at that station.

8. A normally at rest code communication system for communicating respective controls between two remotely located stations, duplex line circuit linkage means connecting the two stations whereby simultaneous communication can be maintained over two respective channels at the same time, manually operable initiating means at each of the stations for designating a control for transmission, code communication means including both of said channels rendered active for the transmission of a control code in response to the actuation of said initiating means at that station for transmitting a set of code characters characterizing the control that has been designated, code receiving means at each of the stations, and check code communication means at each station effective during each cycle initiated by the other station to transmit a code corresponding character for character with the code that has been received from the other station during that cycle.

9. A normally at rest code communication system for communicating controls through respective cycles of operation from a first to a second station, a duplex line circuit organization connecting the two stations and providing two respective communicaton channels, manually operable means at said first station for designating each of a plurality of controls that may be desired to be transmitted, indication means at each station, code communication means effective in response to the designation of a control for transmission at said first station for transmitting stepping pulses from said second station to said first station over one of said channels and for simultaneously transmitting a code over the other channel from said first station characteristic of the control that has been designated at that station for transmission, code receiving means at said second station effective to selectively govern said indication means at that station in accordance with respective control codes that are transmitted from said first station, check code communication means effective during each cycle of transmission of a control from said first station to transmit a check code matching character for character with the control code that is received at said second station during that cycle, and code receiving means at said first station effective to actuate said indication means at that station at the end of a cycle during which a control has been been transmitted from said first station to said second station, only provided that a check code is received from said second station matching character for character with the control code that has been selected for transmission from said first station during that cycle.

10. A normally at rest code communication system for communicating controls between two remotely located stations through respective cycles of operation, a duplex line circuit organization connecting the two stations and providing two respective channels, manually operable means at each station for designating any selected one of a plurality of controls for transmission during a single cycle, code communication means effective in response to the designation of a control for transmission at either of said stations for transmitting stepping pulses from the other station over one of said channels and for simultaneously transmitting a control code over the other channel characteristic of the control that has been designated for transmission, indication means at each station, code reeciving means at each station effective to selectively govern said indication means at that station in accordance with the reception of codes designated for transmission by the other station, check code communicating means effective during each cycle of transmission of a designated control to transmit a check code from the other station matching character for character with the control code that has been received by said code receiving means during that cycle, and code receiving means at each station effective to actuate said indication means at the end of a cycle during which a control has been transmitted to the other station, only provided that a check code is received from said other station matching character for character with the control code that has been selected for transmission to said other station during that cycle.

11. A communication system for maintaining communicaton between two stations comprising in combination, line circuit means connecting the two stations, normally at rest code communication apparatus at both stations effective when initiated to transmit a control code from one station to the other station during a plurality of steps, one step being taken for each character of the code transmitted, code receiving means at each station responsive during each step to the code character transmitted from the other station on the next preceding step, and manually operable switching means for rendering said code receiving means ineffective in response to the code character transmitted during the next preceding step and rendering said code receiving means responsive to the code character transmitted during the second preceding step, whereby increased line propagation time may be compensated for by use of an extra step without changing the rate of pulse transmission.

12. In a step by step communication system for communicating between two remotely spaced stations, code communication means including a two channel line circuit connecting said stations effective when initiated into a cycle of operation to transmit simultaneously stepper cynchronizing pulses over one channel in one direction and a code comprising selected marks and spaces over the other channel in the opposite direction, a selector switch at each station, and code receiving means at each station responsive during respective steps to either the code character transmitted on the preceding step from the other station or the code character transmitted on the second preceding step from the other station in accordance with the position of said selector switch, whereby compensation can be made for increased line propagation time.

13. A step by step communication system for communicating between two remotely spaced stations comprising in combination, code transmitting means including a two channel line circuit connecting said stations effective when initiated into a cycle of operation to transmit simultaneously stepper synchronizing pulses over one channel in one direction, and a code comprising selected marks and spaces over the other channel in the opposite direction, manually operable means for adjusting the time of transmission of said code characters as compared to respective stepping pulses received from the other station, a selector switch at each station, and code receiving means at each station responsive during respective steps to either the code character transmitted on the preceding step from the other station or the code character transmitted on the second preceding step from the other station in accordance with the position of said selector switch.

14. A communication system for communicating designated controls during respective control cycles from a first station to a second station comprising in combination, two line circuits connecting said stations, one of said line circuits having transmitting contacts at said first station and a line relay at said second station, and the other of said line circuits having transmitting contacts at said second station and a line relay at said first station, manually operable means at said first station for designating a control to be transmitted to said second station, means including said line circuits effective in response to the actuation of said manually operable means at said first station for transmitting a series of stepping pulses over said other line circuit during the first half of a cycle and over said one line circuit during the second half of that cycle, stepping means at each of the stations operable in synchronism with said stepping pulses, code transmitting means at said first station effective to transmit over said one line circuit during the first half of a control cycle initiated at that station a code characteristic of a particular control that has been designated for transmission, and check code transmitting means at said second station effective during the second half of each cycle initiated at said first station to transmit a check code over said other line circuit corresponding to the code that has been received during the first half of the cycle as transmitted over said first line circuit.

15. A communication system for communicating controls during respective cycles of operation between two stations comprising in combination, duplex line circuit linkage means connecting the two stations whereby simultaneous communication can be maintained over two respective channels at the same time, manually operable initiating means at each of the stations for designating a control for transmission, means responsive to the designation of a control for transmission at either of said stations for causing the transmission of stepping pulses from the other station during the first half of a cycle and the transmission of stepping pulses from that station during the second half of that cycle, stepping means at both stations actuated in correspondence with stepping pulses transmitted over either channel, and code transmitting means rendered active for the transmission of a control code during the first half of each cycle initiated at that station and rendered active for the transmission of a check code during the second half of each control cycle that is initiated by the other station.

16. In a normally at rest code communication system for communicating between two stations, the combination with a two channel line circuit, one channel adapted for transmission from one station and the other channel being adapted for transmission from the other station, and manually operable means for initiating the code communication system into a cycle operation for the transmission of a selected control; of stepping pulse transmitting means at each station rendered effective to transmit stepping pulses over one of said channels during the first half of each cycle initiated by the actuation of said manually operable means at the other station, said stepping pulse transmitting means also being effective to transmit stepping pulses over one of said channels during the last half of each cycle initiated by the actuation of said manually operable means at that station, and normally energized stepping relay apparatus at both stations actuated in correspondence with said stepping pulses, said stepping means being normally energized when the system is at rest, being deenergized one step at a time in correspondence with said stepping pulses during the first half of a cycle initiated at that station, and being picked up a step at a time in correspondence with said stepping pulses during the second half of a cycle initiated at that station.

17. A code communication system for communicating designated controls during respective cycles of operation between first and second stations comprising in combination, two line circuits connecting said stations, one of said line circuits having transmitting contacts at said first station and a line relay at said second station, and the other of said line circuits having transmitting contacts at said second station and a line relay at said first station, manually operable means at each station for designating respective controls to be transmitted, stepping pulse transmitting means at each station rendered effective to transmit stepping pulses during the first half of each cycle initiated by the actuation of said manually operable means at the other station and during the second half of each cycle initiated by the actuation of said manually operable means at that station, stepping means at each of the stations effective to step in synchronism with the transmission of stepping pulses over either of said line circuits, code receiving means at each of the stations, and code transmitting means at each of said stations effective to transmit a control code characteristic of a control designated for transmission from that station during the first half of a cycle of operation and effective to transmit a check code during the second half of a cycle initiated by the other station, said check code having code characters corresponding to the characters which have been received during the first part of that cycle.

18. An air traffic control system comprising two remotely spaced flight control stations, a control panel at each station for a particular fix along an airway, said control panel having disposed thereon manually operable means for designating a particular flight altitude for which a flight reservation is desired to be made, and said control panel having disposed thereon two indicator lamps for said flight altitude, one of said indicator lamps being effective when energized to indicate the obtaining of a reservation for said flight altitude designated by the actuation of said manually operable means at the associated station, and the other of said indicator lamps being effective when energized to indicate the designation of a reservation for said flight altitude at the other station, a normally deenergized reservation control relay at each station for said flight altitude, circuit means for energizing said reservation control relay in response to the actuation of said manually operable means at the associated station for designation of a reservation, normally at rest code communication apparatus including line circuit means connecting said stations, said code communication apparatus being rendered effective in response to the energization of said reservation control relay at either station to transmit a reservation control code from the associated station during the first half of a communication cycle of operation and to transmit a check code in the opposite direction during the last half of the communication cycle, and code receiving means at each of the stations, said code receiving means being effective to energize said one indicator lamp at the associated station upon the reception of a particular check code only provided that said reservation control relay at the associated station is energized, and said code receiving means being effective to energize said other indicator lamp at the associated station upon the reception of a particular code only provided that said reservation control relay for the corresponding flight altitude at the associated station is in its deenergized position.

19. In an air traffic control system having two remotely spaced flight control stations, a control panel at each station for a particular fix along an airway, said control panel having disposed thereon manually operable means for designation of a particular flight altitude for which a reservation is desired to be made, and said control panel having disposed thereon two indicators for said flight altitude, one of said indicators being effective when actuated to indicate a reservation obtained by actuation of said manually operable means at the associated station, and the other of said indicators being effective when actuated to indicate a reservation as being designated for said flight altitude at the other station, a reservation control relay at each station for said flight altitude actuated in response to the actuation of said manually operable means at the associated station, normally at rest code communication apparatus including line circuit means connecting said stations, said code communication apparatus being rendered active in response to the actuation of said control relay at either station to transmit a control code from the associated station during the first part of a communication cycle of operation and to transmit a check code in the opposite direction during the last part of the communication cycle, and code receiving means at each of the stations, said code receiving means being effective to actuate said one indicator at the associated station in response to the reception of a particular code only provided that said reservation control relay at the associated station is in one position, and said code receiving means being effective to actuate said other indicator at the associated station in response to the reception of a particular code only provided that said reservation control relay at the associated station is in a different position.

NELSON B. COLEY.

REFERENCES CITED

The following references are of record in the file of this patent:

UNITED STATES PATENTS

| Number | Name | Date |
|---|---|---|
| 2,139,352 | Boswau | Dec. 6, 1938 |
| 2,268,240 | Brixner | Dec. 30, 1941 |
| 2,276,646 | Boswau | Mar. 17, 1942 |
| 2,344,231 | Burns | Mar. 14, 1944 |
| 2,444,243 | Breese | June 29, 1948 |
| 2,452,590 | McWhirter et al. | Nov. 2, 1948 |